(12) United States Patent
Yamaki

(10) Patent No.: US 12,453,466 B2
(45) Date of Patent: Oct. 28, 2025

(54) ENDOSCOPE SYSTEM AND OPERATION METHOD THEREFOR

(71) Applicant: FUJIFILM Corporation, Tokyo (JP)

(72) Inventor: Teppei Yamaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 40 days.

(21) Appl. No.: 18/051,128

(22) Filed: Oct. 31, 2022

(65) Prior Publication Data

US 2023/0132998 A1    May 4, 2023

(30) Foreign Application Priority Data

Nov. 1, 2021  (JP) .................................. 2021-179070

(51) Int. Cl.
*A61B 1/06*        (2006.01)
*A61B 1/00*        (2006.01)
(Continued)

(52) U.S. Cl.
CPC ........ *A61B 1/0655* (2022.02); *A61B 1/00009* (2013.01); *A61B 1/0002* (2013.01);
(Continued)

(58) Field of Classification Search
CPC . A61B 1/0655; A61B 1/0638; A61B 1/00009; A61B 1/000094; A61B 1/0669;
(Continued)

(56) References Cited

U.S. PATENT DOCUMENTS

2004/0124791 A1*  7/2004  Takahashi ............ A61B 1/0646
                                                    315/297
2007/0010712 A1*  1/2007  Negishi ................ G02B 6/4296
                                                    600/181
(Continued)

FOREIGN PATENT DOCUMENTS

JP    2013-000176 A    1/2013
JP    2013-046672 A    3/2013
(Continued)

OTHER PUBLICATIONS

"Notice of Reasons for Refusal" Office Action issued in JP 2021-179070; mailed by the Japanese Patent Office on Jul. 29, 2025.

*Primary Examiner* — John W Miller
*Assistant Examiner* — Humam M Satti
(74) *Attorney, Agent, or Firm* — Studebaker Brackett PLLC

(57) ABSTRACT

A processor generates an endoscopic image in a frame for calculating a light amount, calculates a light emission amount that is an amount of illumination light, in which brightness of the endoscopic image is a target brightness, stores the light emission amount as a storage light emission amount, selects the latest storage light emission amount as a designated light emission amount from among one or more storage light emission amounts in accordance with the type of the illumination light, and causes a light source device to emit the illumination light with the designated light emission amount in a scheduled emission frame after the frame for calculating a light amount in a time series.

16 Claims, 19 Drawing Sheets

(51) Int. Cl.
*H04N 23/50* (2023.01)
*H04N 23/71* (2023.01)
*H04N 23/73* (2023.01)
*H04N 23/74* (2023.01)

(52) U.S. Cl.
CPC ......... A61B 1/0638 (2013.01); H04N 23/555 (2023.01); H04N 23/71 (2023.01); H04N 23/73 (2023.01); H04N 23/74 (2023.01)

(58) Field of Classification Search
CPC ..... A61B 1/0002; A61B 1/045; A61B 1/0684; A61B 1/000095; A61B 1/07; A61B 1/00006; A61B 1/0661; H04N 23/555; H04N 23/56; H04N 23/71; H04N 23/73; H04N 23/74
USPC .......................................................... 348/68
See application file for complete search history.

(56) References Cited

U.S. PATENT DOCUMENTS

| | | | | |
|---|---|---|---|---|
| 2009/0262225 A1* | 10/2009 | Yamaguchi | ............ | A61B 1/063 348/E5.022 |
| 2009/0306478 A1* | 12/2009 | Mizuyoshi | ............... | A61B 1/07 600/178 |
| 2013/0012864 A1* | 1/2013 | Kubo | .................... | A61B 1/041 604/20 |
| 2013/0050456 A1* | 2/2013 | Sakurai | .................. | H04N 23/74 348/311 |
| 2013/0245410 A1* | 9/2013 | Saito | .................... | A61B 1/0051 600/339 |
| 2014/0171737 A1* | 6/2014 | Kagaya | ................ | H04N 25/531 600/109 |
| 2014/0171738 A1* | 6/2014 | Kagaya | ................ | A61B 1/051 600/109 |
| 2017/0360275 A1* | 12/2017 | Yoshizaki | .......... | A61B 1/00055 |
| 2018/0174283 A1* | 6/2018 | Makino | .................. | H04N 25/10 |
| 2018/0218482 A1* | 8/2018 | Ganesan | .................. | G06T 7/10 |
| 2019/0149750 A1* | 5/2019 | Thebault | ................ | H04N 25/40 348/302 |
| 2020/0154028 A1 | 5/2020 | Muramatsu et al. | | |
| 2021/0369096 A1 | 12/2021 | Iwane | | |
| 2022/0218190 A1* | 7/2022 | Saito | .................. | A61B 1/00096 |
| 2023/0037060 A1* | 2/2023 | Shimomura | ............ | G02B 23/26 |
| 2023/0363630 A1* | 11/2023 | Hayashi | ............ | G02B 19/0066 |
| 2024/0268651 A1* | 8/2024 | Hayashi | ................ | H04N 23/74 |

FOREIGN PATENT DOCUMENTS

| | | |
|---|---|---|
| JP | 2013-188365 A | 9/2013 |
| JP | 2016-041388 A | 3/2016 |
| WO | 2018/216276 A1 | 11/2018 |
| WO | 2020/171012 A1 | 8/2020 |

* cited by examiner

ENDOSCOPE SYSTEM AND OPERATION METHOD THEREFOR

CROSS-REFERENCE TO RELATED APPLICATIONS

This application claims priority under 35 U.S.C. § 119(a) to Japanese Patent Application No. 2021-179070 filed on 1 Nov. 2021. The above application is hereby expressly incorporated by reference, in its entirety, into the present application.

BACKGROUND OF THE INVENTION

1. Field of the Invention

The present invention relates to an endoscope system that controls an amount of light in a case where a plurality of types of endoscopic images are obtained, and an operation method for the endoscope system.

2. Description of the Related Art

At the time of endoscopy, a plurality of types of illumination light are used for various observation purposes. For example, in a case of performing screening observation, wide band illumination light is used, and in a case of observing an arrangement of blood vessels or a pit pattern for diagnosing a lesion part, narrow band illumination light is used. There is a technique of performing exposure control for setting the brightness of an endoscopic image to be appropriate by controlling an amount of various types of illumination light in order to enable a doctor or the like to perform such observation with high accuracy For example, there is a technique in which, in a case where a plurality of types of illumination light is emitted to an observation target, a target amount of each type of illumination light is calculated to control an amount of light on the basis of brightness information of a key image obtained by using key illumination light, and a light amount ratio between the key illumination light and other types of illumination light (refer to JP2013-188365A, corresponding to US2013/245410A1).

SUMMARY OF THE INVENTION

In the related art, it is assumed that a light amount ratio between key illumination light and other types of illumination light is constant. However, since the spectral sensitivity of an observation target changes for each frame depending on the type of illumination light or an imaging scene, in a case where the brightness of other types of image signals is adjusted by using an image signal obtained by using the key illumination light, there may be a problem that other types of images are too dark or too bright depending on an image signal obtained by using the key illumination light. In order to solve such a problem, in a case where an image is obtained by using a plurality of types of illumination light, there is a need for a technique capable of obtaining an image having a brightness more appropriate for the purpose of acquiring each image.

An object of the present invention is to provide an endoscope system capable of obtaining an endoscopic image having more appropriate brightness in a case where a plurality of types of illumination light is emitted to obtain a plurality of types of endoscopic images, and an operation method therefor.

According to the present invention, there is provided an endoscope system including an endoscope that picks up an image of an observation target; a light source device that emits first illumination light and second illumination light having a spectrum different from a spectrum of the first illumination light; and a processor, in which the processor generates a first illumination light image obtained by picking up an image of the observation target by using the first illumination light or a second illumination light image obtained by picking up an image of the observation target by using the second illumination light, in a frame for calculating a light amount, calculates a first light emission amount that is an amount of the first illumination light, in which brightness of the first illumination light image is a first target brightness and a second light emission amount that is an amount of the second illumination light, in which brightness of the second illumination light image is a second target brightness different from the first target brightness at any timing after the frame for calculating a light amount in a time series, stores the first light emission amount as a first storage light emission amount, stores the second light emission amount as a second storage light emission amount, in a case where the first illumination light is emitted in a scheduled emission frame after the frame for calculating a light amount in a time series, selects the latest first storage light emission amount as a first designated light emission amount from among one or more first storage light emission amounts, in a case where the second illumination light is emitted in the scheduled emission frame, selects the latest second storage light emission amount as a second designated light emission amount from among one or more second storage light emission amounts, and causes the light source device to emit the first illumination light with the first designated light emission amount or the second illumination light with the second designated light emission amount in the scheduled emission frame.

It is preferable that the processor acquires first past emission information that is information indicating that the first illumination light is emitted in the frame for calculating a light amount and associated with the first target brightness and a parameter for calculating the first light emission amount, and second past emission information that is information indicating that the second illumination light is emitted in the frame for calculating a light amount and associated with the second target brightness and a parameter for calculating the second light emission amount, calculates the first light emission amount by using the parameter for calculating the first light emission amount associated with the first past emission information, and calculates the second light emission amount by using the parameter for calculating the second light emission amount associated with the second past emission information.

It is preferable that the processor sets the first storage light emission amount by associating the first light emission amount with the first past emission information, sets the second storage light emission amount by associating the second light emission amount with the second past emission information, acquires first scheduled emission information that is information indicating that the first illumination light is emitted in the scheduled emission frame, or second scheduled emission information that is information indicating that the second illumination light is emitted in the scheduled emission frame, in a case where the first scheduled emission information is acquired, selects the first designated light emission amount from among the first storage light emission amounts associated with the first past emission information, and in a case where the second scheduled emission information is acquired, selects the second designated light emission amount from among the second storage light emission amounts associated with the second past emission information.

It is preferable that the processor acquires the first past emission information or the second past emission information related to the frame for calculating a light amount for two or more frame for calculating a light amounts, and acquires the first scheduled emission information or the second past emission information related to the scheduled emission frame for one or more scheduled emission frame.

It is preferable that the processor associates the first target brightness and the parameter for calculating the first light emission amount with the first scheduled emission information acquired before the frame for calculating a light amount in a time series, and acquires the first past emission information by updating the first scheduled emission information to the first past emission information indicating that the first illumination light has been emitted in the frame for calculating a light amount, and associates the second target brightness and the parameter for calculating the second light emission amount with the second scheduled emission information acquired before the frame for calculating a light amount in a time series, and acquires the second past emission information by updating the second scheduled emission information to the second past emission information indicating that the second illumination light has been emitted in the frame for calculating a light amount.

It is preferable that the processor switches a mono-light emission mode in which only the first illumination light or the second illumination light is emitted from the light source device, a pattern light emission mode in which the first illumination light and the second illumination light are emitted from the light source device according to a specific light emission pattern, and a flexible light emission mode in which the first illumination light and the second illumination light are irregularly emitted from the light source device, and acquires the first scheduled emission information or the second scheduled emission information at a timing at which each of the mono-light emission mode, the pattern light emission mode, and the flexible light emission mode is switched.

It is preferable that, in a case of the pattern light emission mode, the processor acquires the first scheduled emission information or the second scheduled emission information at a timing at which the specific light emission pattern is changed.

It is preferable that the light source device emits three or more types of illumination light for picking up an image of the observation target in the frame for calculating a light amount, and the processor acquires three or more types of endoscopic images obtained by picking up an image of the observation target, calculates a light emission amount that is an amount of the illumination light for setting brightness of the three or more types of endoscopic images to a target brightness, stores the light emission amount as a storage light emission amount, selects a designated light emission amount from among one or more storage light emission amounts according to the type of the illumination light emitted in the scheduled emission frame, and causes the light source device to emit three or more types of the illumination light with the designated light emission amount in the scheduled emission frame.

It is preferable that the processor calculates a brightness on the basis of a luminance value of the endoscopic image, and calculates the light emission amount by using the brightness.

According to the present invention, there is provided an endoscope system including an endoscope that picks up an image of an observation target; a light source device that emits first illumination light and second illumination light having a spectrum different from a spectrum of the first illumination light according to a specific light emission pattern; and a processor, in which the processor acquires a first illumination light image obtained by picking up an image of the observation target by using the first illumination light or a second illumination light image obtained by picking up an image of the observation target by using the second illumination light, in a frame for calculating a light amount, calculates a first light emission amount that is an amount of the first illumination light, in which brightness of the first illumination light image is a first target brightness or a second light emission amount that is an amount of the second illumination light, in which brightness of the second illumination light image is a second target brightness different from the first target brightness, from a frame for calculating a light amount to a scheduled emission frame that is a frame after a lapse of a specific number of frames, stores the first light emission amount as a first storage light emission amount, stores the second light emission amount as a second storage light emission amount, and causes the light source device to emit the first illumination light with the first storage light emission amount or the second illumination light with the second storage light emission amount in the scheduled emission frame.

It is preferable that the specific light emission pattern is a light emission cycle consisting of one or more illumination periods that are periods during which the first illumination light or the second illumination light is emitted, and the specific number of frames is a number matching the number of the illumination periods included in the light emission cycle.

It is preferable that the specific number of frames is the number of frames from emission of the first illumination light in the frame for calculating a light amount to emission of the first illumination light, or the number of frames from emission of the second illumination light in the frame for calculating a light amount to emission of the second illumination light.

It is preferable that the endoscope system further includes an image pick-up sensor that picks up an image of the observation target according to a pseudo-global shutter method.

According to the present invention, there is provided an operation method for an endoscope system, including a step of picking up an image of an observation target; a step of emitting first illumination light and second illumination light having a spectrum different from a spectrum of the first illumination light; a step of generating a first illumination light image obtained by picking up an image of the observation target by using the first illumination light or a second illumination light image obtained by picking up an image of the observation target by using the second illumination light, in a frame for calculating a light amount; a step of calculating a first light emission amount that is an amount of the first illumination light, in which brightness of the first illumination light image is a first target brightness and a second light emission amount that is an amount of the second illumination light, in which brightness of the second illumination light image is a second target brightness different from the first target brightness at any timing after the frame for calculating a light amount in a time series;

a step of storing the first light emission amount as a first storage light emission amount; a step of storing the second light emission amount as a second storage light emission amount; a step of, in a case where the first illumination light is emitted in a scheduled emission frame after the frame for calculating a light amount in a time series, selecting the latest first storage light emission amount as a first designated light emission amount from among one or more first storage light emission amounts; a step of, in a case where the second illumination light is emitted in the scheduled emission frame, selecting the latest second storage light emission amount as a second designated light emission amount from among one or more second storage light emission amounts; and a step of causing the light source device to emit the first illumination light with the first designated light emission amount or the second illumination light with the second designated light emission amount in the scheduled emission frame.

According to the present invention, there is provided an operation method for an endoscope system, including a step of picking up an image of an observation target; a step of emitting first illumination light and second illumination light having a spectrum different from a spectrum of the first illumination light according to a specific light emission pattern; a step of acquiring a first illumination light image obtained by picking up an image of the observation target by using the first illumination light or a second illumination light image obtained by picking up an image of the observation target by using the second illumination light, in a frame for calculating a light amount; a step of calculating a first light emission amount that is an amount of the first illumination light, in which brightness of the first illumination light image is a first target brightness or a second light emission amount that is an amount of the second illumination light, in which brightness of the second illumination light image is a second target brightness different from the first target brightness, from a frame for calculating a light amount to a scheduled emission frame that is a frame after a lapse of a specific number of frames; a step of storing the first light emission amount as a first storage light emission amount; a step of storing the second light emission amount as a second storage light emission amount; and a step of causing the light source device to emit the first illumination light with the first storage light emission amount or the second illumination light with the second storage light emission amount in the scheduled emission frame.

According to the present invention, in a case where a plurality of types of illumination light is emitted to obtain a plurality of types of endoscopic images, it is possible to obtain an image having more appropriate brightness.

DESCRIPTION OF THE PREFERRED EMBODIMENTS

First Embodiment

Figure 1:
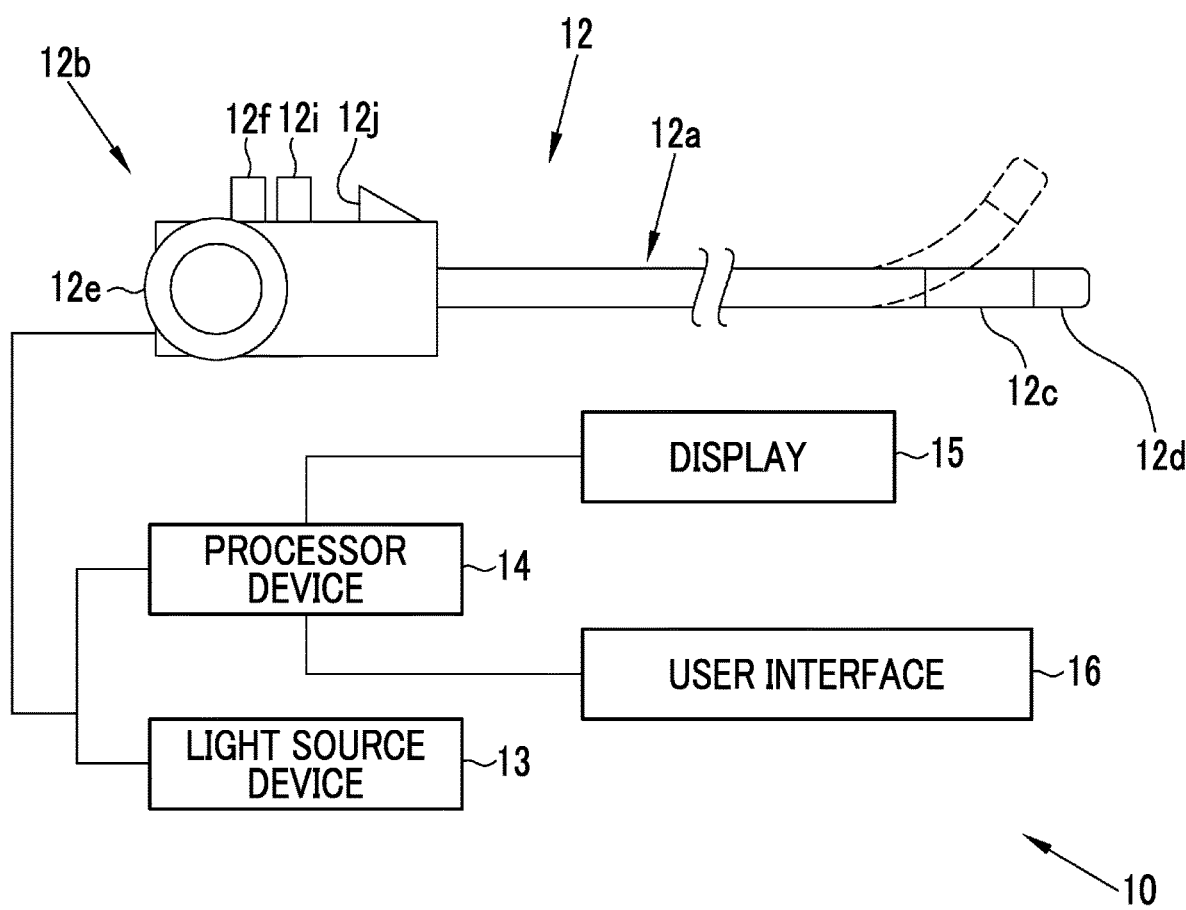
FIG. 1 is an external view of an endoscope system.

As shown in FIG. 1, an endoscope system 10 includes an endoscope 12, a light source device 13, a processor device 14, a display 15, and a user interface 16. The endoscope 12 is optically connected to the light source device 13 and electrically connected to the processor device 14. Various types of connection are not limited to wired connection and may be wireless connection. Connection using a network may be used.

The light source device 13 supplies illumination light to the endoscope 12. The display 15 displays an N-th illumination light image as a display image. N is a natural number of 1 or more. The user interface 16 includes a keyboard, a mouse, a microphone, a foot switch, a tablet terminal, a touch pen, and the like, and receives input operations such as function settings. The processor device 14 controls image processing, analysis, and display of an image signal transmitted from the endoscope 12 and controls a device such as the light source device 13 connected to the processor device 14.

The endoscope 12 has an insertion part 12a, an operating part 12b, a bendable part 12c, and a tip part 12d. The insertion part 12a is inserted into the body of a subject. The operating part 12b is provided at a base end portion of the insertion part 12a. The bendable part 12c and the tip part 12d are provided on a tip end side of the insertion part 12a. The bendable part 12c is bent by operating an angle knob 12e of the operating part 12b. The tip part 12d is directed in a desired direction in a case where the bendable part 12c is bent. The tip part 12d emits the illumination light toward the observation target and receives the reflected light from the observation target to image the observation target. A forceps channel (not shown) for inserting a treatment tool or the like may be provided from the insertion part 12a to the tip part 12d. The treatment tool is inserted into the forceps channel from a forceps port 12j.

The operating part 12b is provided with an angle knob 12e, a mode selector switch 12f, and a zoom operating part 12i. The mode selector switch 12f is used for a mode switching operation. The zoom operating part 12i is used to operate a zoom lens 42.

Figure 2:
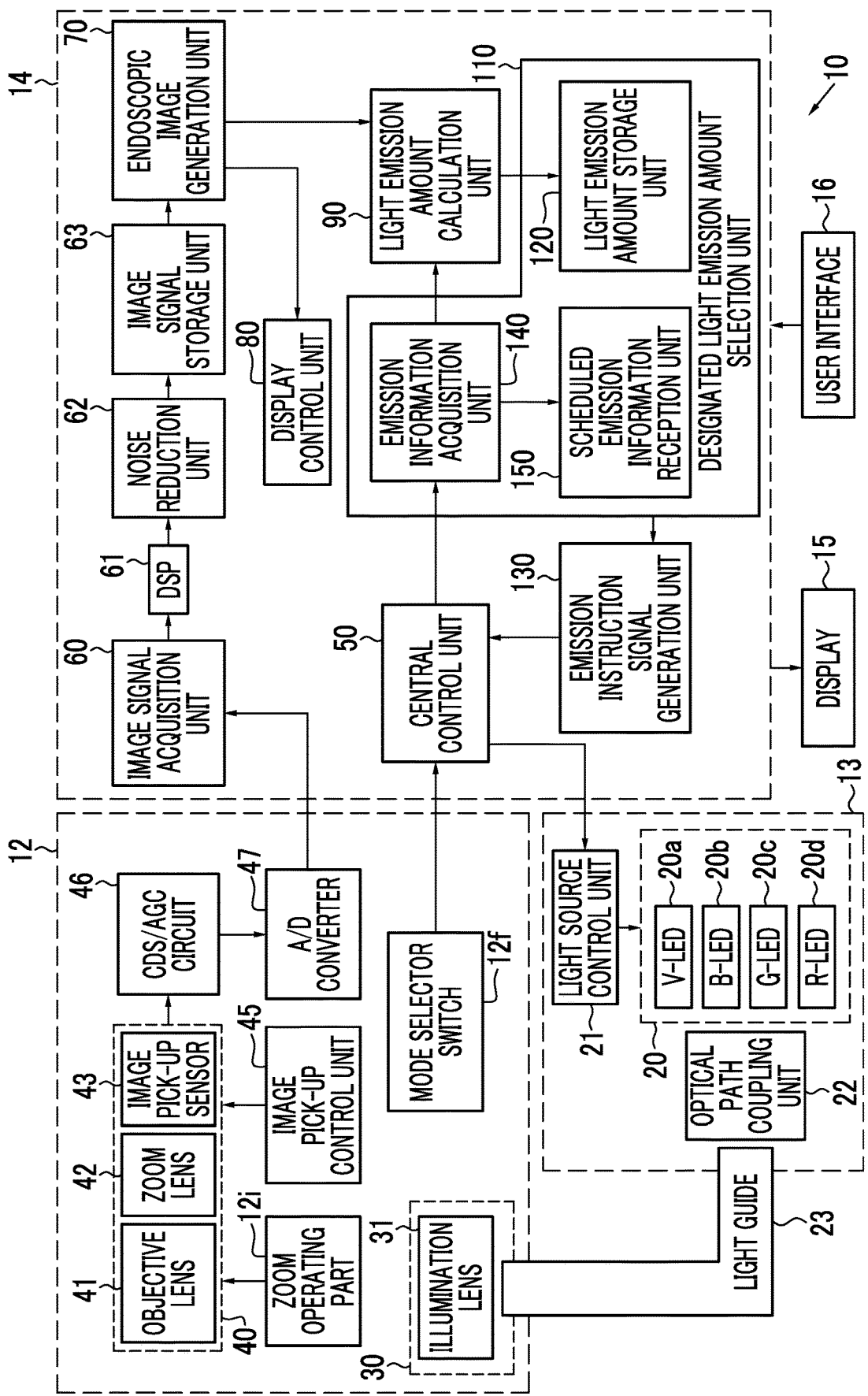
FIG. 2 is a block diagram showing a function of the endoscope system.

As shown in FIG. 2, the light source device 13 includes a light source unit 20, a light source control unit 21, and an optical path coupling unit 22. The light source control unit 21 is controlled by a central control unit 50 of the processor device 14.

The light source unit 20 is configured with, for example, a semiconductor light source such as multi-color light emitting diodes (LEDs), a combination of a laser diode and a phosphor, or a xenon lamp or a halogen light source. In the example in FIG. 2, the light source unit 20 includes four color LEDs such as a violet light emitting diode (V-LED) 20a, a blue light emitting diode (B-LED) 20b, and a green light emitting diode (G-LED) 20c, and a red light emitting diode (R-LED) 20d. The light source unit 20 includes an optical filter or the like for adjusting a wavelength range of light emitted by the LED or the like.

The light source control unit 21 emits a plurality of types of illumination light for illuminating an observation target through light source control for turning or off the semiconductor light sources of a plurality of colors and controlling an amount of emitted light when the semiconductor light sources are turned on. The light source control unit 21 controls a wavelength range of the illumination light by changing an optical filter or the like.

Figure 3:
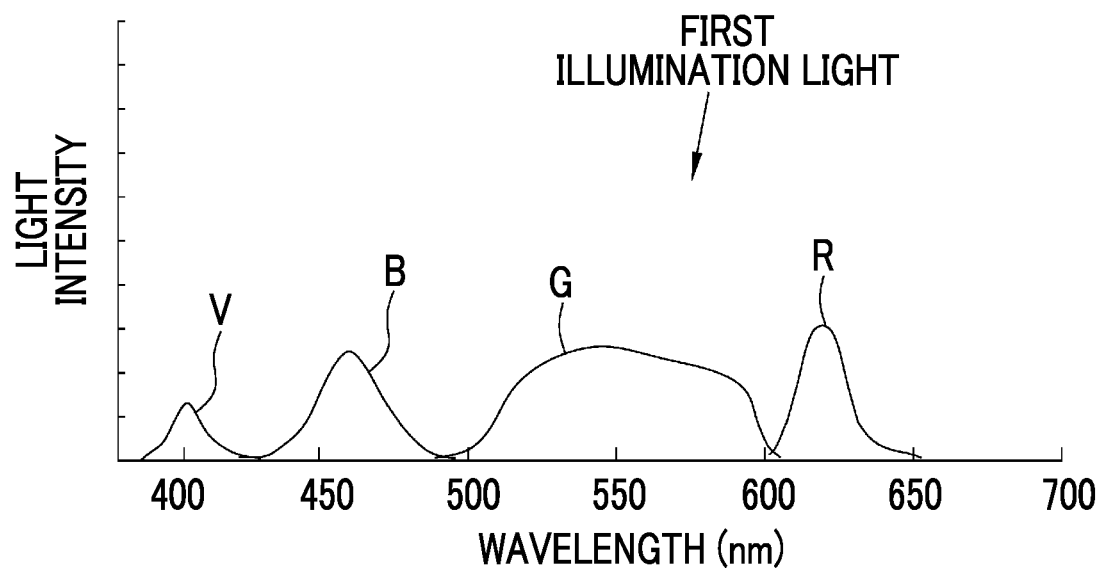
FIG. 3 is a graph showing a spectrum of first illumination light.
Figure 4:
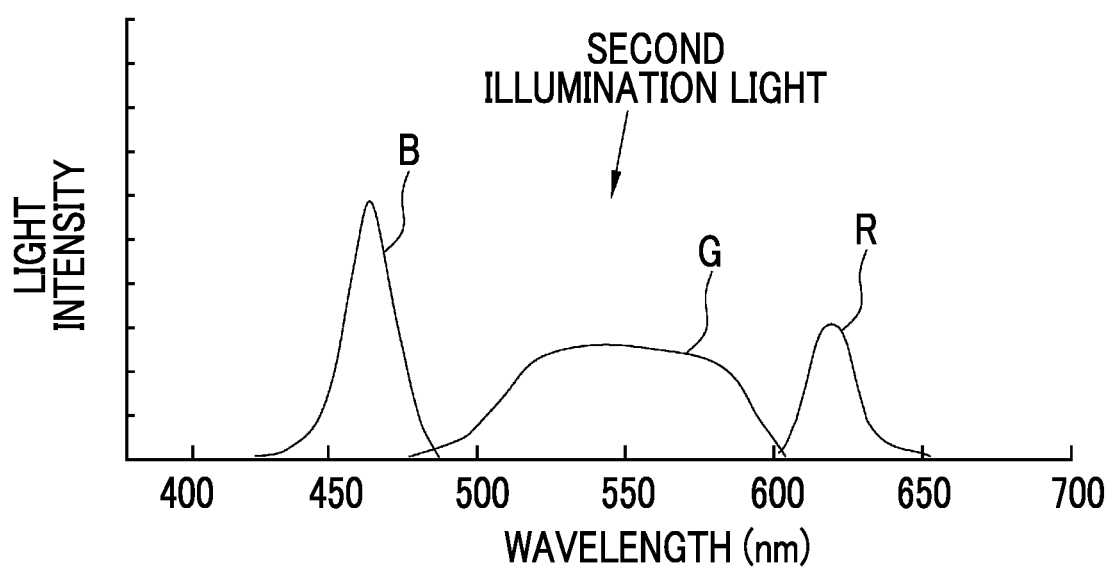
FIG. 4 is a graph showing a spectrum of second illumination light.

As a variation of the type of illumination light, for example, there are first illumination light and second illumination light having different spectra, as shown in FIG. 3 and FIG. 4. In a case of emitting the first illumination light having a spectrum as shown in FIG. 3, the V-LED 20a generates violet light V having a central wavelength of 410±10 nm and a wavelength range of 380 to 420 nm. The B-LED 20b generates blue light B having a central wavelength of 450±10 nm and a wavelength range of 420 to 500 nm. The G-LED 20c generates green light G having a wavelength range of 480 to 600 nm. The R-LED 20d generates red light R having a central wavelength of 620 to 630 nm and a wavelength range of 600 to 650 nm.

In a case where the first illumination light is emitted, the light source control unit 21 controls the respective LEDs 20a to 20d such that a combination of the light intensity ratios of the violet light V, the blue light B, the green light G, and the red light R is Vc:Bc:Gc:Rc. The first illumination light is wide-band white light suitable for screening observation.

In a case where the second illumination light having the spectrum as shown in FIG. 4 is emitted, the blue light B, the green light G, and the red light R are combined by simultaneously turning on the B-LED 20b, the G-LED 20c, and the R-LED 20d. The light source control unit 21 controls the respective LEDs 20a to 20d such that a combination of the light intensity ratios between the violet light V, the blue light B, the green light G, and the red light R is Vs:Bs:Gs:Rs. The second illumination light is narrow-band special light suitable for finding a low oxygen region suggesting the presence of a tumor by calculating the oxygen saturation in an observation target by using a difference between the absorption coefficients of the oxidized hemoglobin and the reduced hemoglobin.

Figure 5:
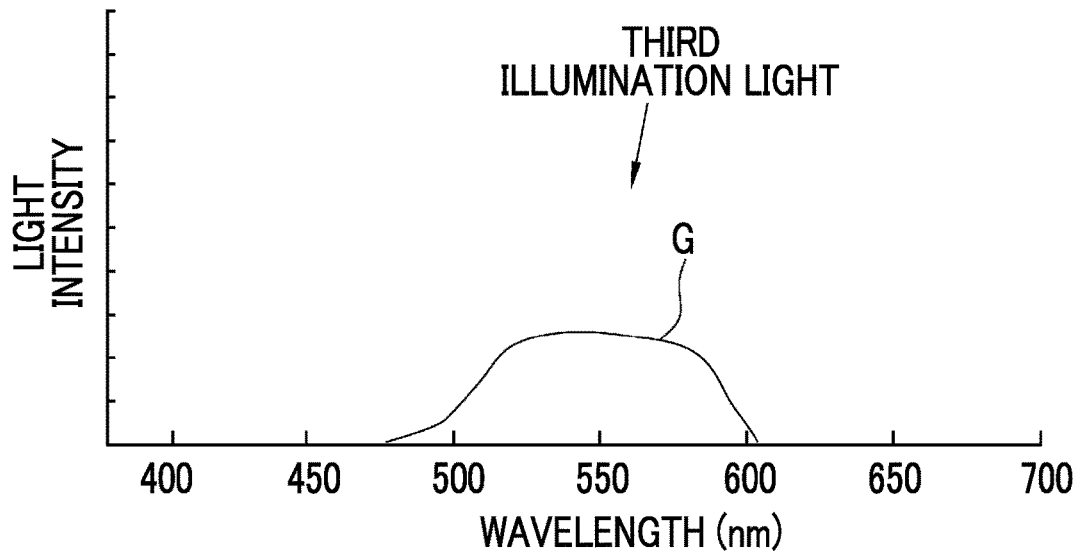
FIG. 5 is a graph showing a spectrum of third illumination light.

The illumination light is not limited to this, and any type of illumination light (N-th illumination light) having a spectrum different from that of the first illumination light and the second illumination light may be used depending on a combination of intensities of light emitted from the respective light sources. For example, in a case where third illumination light having a spectrum as shown in FIG. 5 is emitted, the G-LED 20c is turned on and the green light G is emitted. The light source control unit 21 controls the respective LEDs 20a to 20d such that a combination of the light intensity ratios between the violet light V, the blue light B, the green light G, and the red light R is Vt:Bt:Gt:Rt. The third illumination light is special light for reflecting the concentration of a biological pigment such as a yellow pigment in an observation target in calculation of the oxygen saturation.

The combination of the light intensity ratios, as in the second illumination light and the third illumination light, includes a case where a ratio of one or more semiconductor light source is 0 (zero). For example, even in a case where only one of the semiconductor light sources is turned on and the other three are not turned on, as in the third illumination light, a light intensity ratio is obtained, which is one of combinations of light intensity ratios.

In the first embodiment, the endoscope system 10 includes a plurality of light emission modes in which the illumination light is emitted in different methods. The light emission mode is roughly classified into two modes such as a mono-light emission mode and a multi-light emission mode. The mono-light emission mode is a light emission mode in which one type of illumination light is emitted among a plurality of types of illumination light. The multi-light emission mode is a light emission mode in which a plurality of types of illumination light are switched and emitted.

Figure 6:
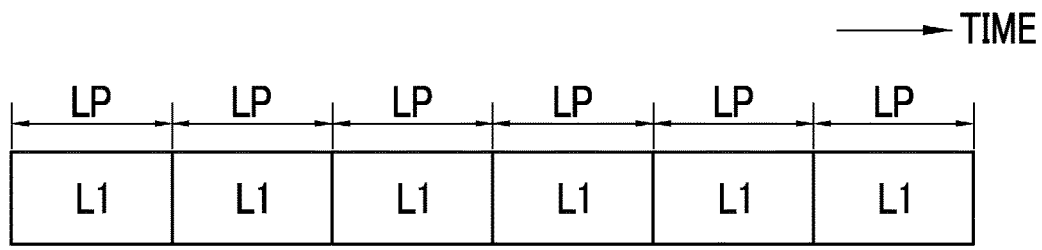
FIG. 6 is an explanatory diagram showing an example of emission of illumination light in a case of a mono-light emission mode.

In the mono-light emission mode and the multi-light emission mode, as shown in FIGS. 6 to 9, one type of illumination light is emitted for each illumination period LP. In the mono-light emission mode, as shown in FIG. 6, first illumination light L1 is emitted for each illumination period LP. The illumination light emitted in the mono-light emission mode may be any type of illumination light from the first illumination light to the N-th illumination light. In this case, the endoscope system 10 includes a mono-light emission first illumination light mode to a mono-light emission N-th illumination light mode as the mono-light emission mode.

Figure 7:
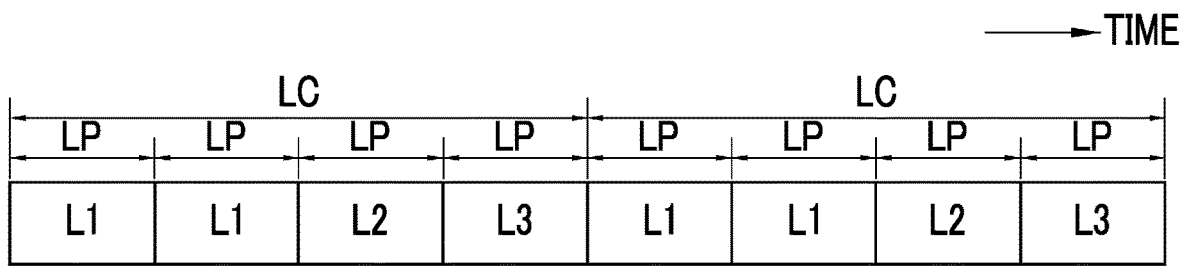
FIG. 7 is an explanatory diagram showing a first light emission pattern.
Figure 8:
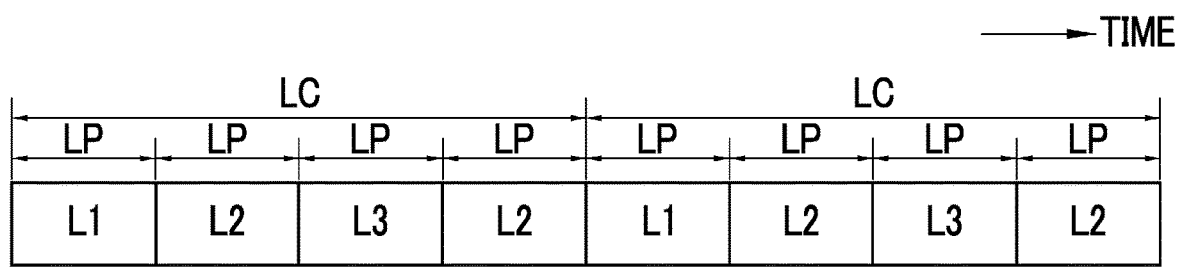
FIG. 8 is an explanatory diagram showing a second light emission pattern.
Figure 9:
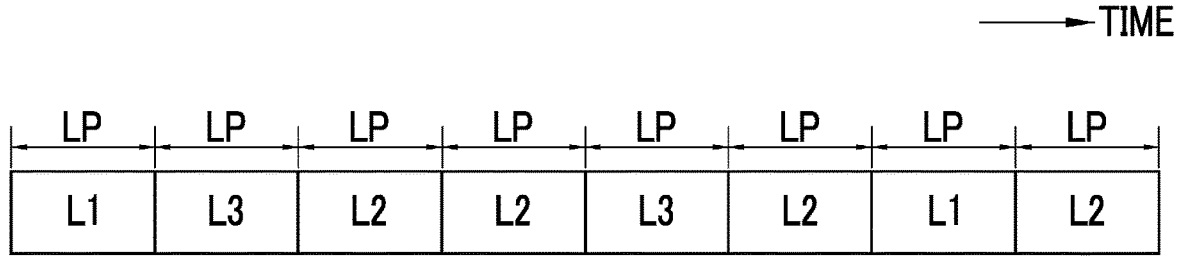
FIG. 9 is an explanatory diagram showing an example of emission of illumination light in a case of a flexible light emission mode.

As the multi-light emission mode, the endoscope system 10 includes a pattern light emission mode in which a plurality of types of illumination light are emitted according to a specific light emission pattern as shown in FIGS. 7 and 8, and a flexible light emission mode in which illumination light is emitted irregularly without a specific light emission pattern as shown in FIG. 9.

In the pattern light emission mode, as shown in FIG. 7, in one light emission cycle LC, a first light emission pattern is repeated in which the illumination light is sequentially emitted in the order of the first illumination light L1, the first illumination light L1, the second illumination light L2, and the third illumination light L3 for each illumination period LP. As shown in FIG. 8, as a second light emission pattern, in one light emission cycle LC, the illumination light may be emitted in the order of the first illumination light L1, the second illumination light L2, the third illumination light L3, and the second illumination light L2 for each illumination period LP. The light emission pattern is not limited to this, and the number of illumination periods included in one light emission cycle and the type of illumination light may be freely set.

In the flexible light emission mode, as shown in FIG. 9, illumination light emitted is determined for each illumination period LP without a specific light emission pattern. The illumination light emitted is determined in accordance with scheduled emission information that is information indicating the type of illumination light emitted for each frame (illumination period LP within one frame), which will be described later. In the case of the flexible light emission mode, for example, an artificial intelligence provided inside or outside the processor device 14 generates scheduled emission information in order to obtain an appropriate number of endoscopic images for each type of illumination light at an appropriate timing according to an observation purpose, transmits the scheduled emission information to an emission information acquisition unit 140 that will be described later, and emits any type of illumination light by controlling the light source unit 20 via the central control unit 50 and the light source control unit 21.

The modes can be switched via the central control unit 50 by a user such as a doctor operating the mode selector switch 12f. The modes may be switched via the user interface 16. It is preferable that the scheduled emission information is transmitted to the emission information acquisition unit 140 that will be described later, via the central control unit 50 at a time at which the mode is switched.

The illumination light emitted from the light source unit 20 for each illumination period is incident to the light guide 23 via the optical path coupling unit 22 configured with a mirror, a lens, or the like. The light guide 23 is built in the endoscope 12 and a universal cord (a cord connecting the endoscope 12, the light source device 13, and the processor device 14 to each other). The light guide 23 propagates the light from the optical path coupling unit 22 to the tip part 12d of the endoscope 12.

An illumination optical system 30 and an image pick-up optical system 40 are provided at the tip part 12d of the endoscope 12. The illumination optical system 30 is an optical system for irradiating an observation target with illumination light, and includes an illumination lens 31. Each type of illumination light propagated by the light guide 23 is applied to the observation target via the illumination lens 31. The light source unit 20 may be built in the tip part 12d of the endoscope 12 instead of providing the light guide 23. In this case, each type of illumination light emitted from the light source unit 20 is emitted to be transmitted through the illumination lens 31 of the illumination optical system 30 and to illuminate an observation target.

The image pick-up optical system 40 is an optical system for forming an image of an observation target, and includes an objective lens 41, a zoom lens 42, and an image pick-up sensor 43. The image pick-up optical system 40 includes a stop and a shutter. The stop and the shutter may be an electronic stop and an electronic shutter instead of being provided as parts. Various types of light such as reflected light, scattered light, and fluorescence from an observation target due to irradiation with the illumination light are incident to the image pick-up sensor 43 via the objective lens 41 and the zoom lens 42, and thus an image of the observation target is formed on the image pick-up sensor 43. The zoom lens 42 is a lens for enlarging an observation target, and moves between the telephoto end and the wide end by operating the zoom operating part 12i to enlarge or reduce the image of the observation target formed on the image pick-up sensor 43.

Figure 10:
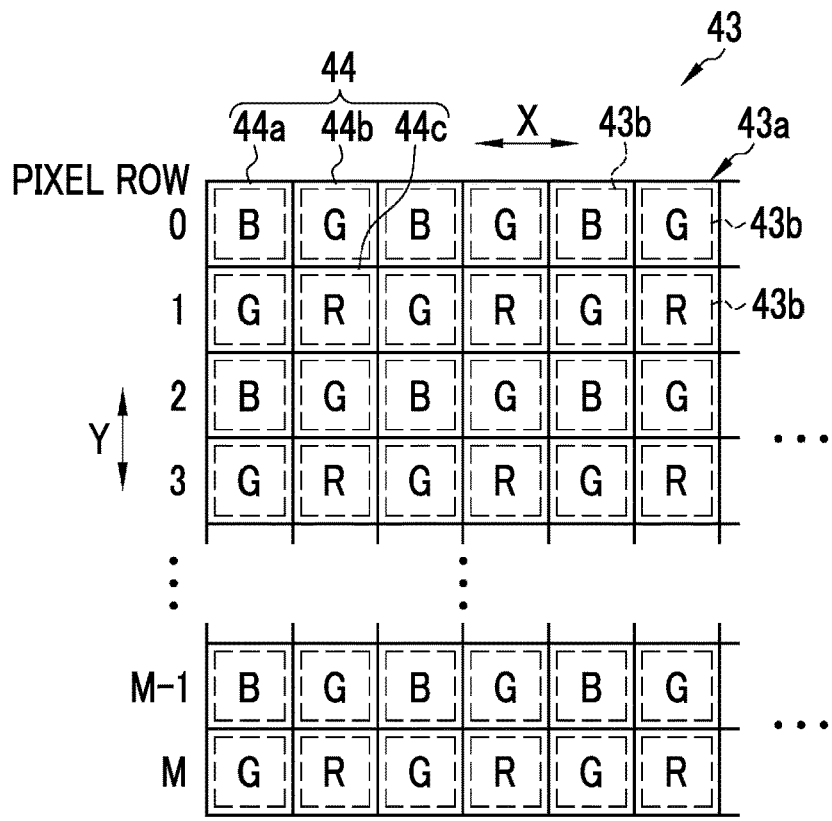
FIG. 10 is an explanatory diagram showing a configuration of an image pick-up sensor.

The image pick-up sensor 43 is a color image pick-up element, and captures an optical image of an observation target and outputs an image signal. A complementary metal oxide semiconductor (CMOS) image sensor is used as the image pick-up sensor 43. As shown in FIG. 10, a plurality of pixels 43b that generate pixel signals through photoelectric conversion are formed on an image pick-up surface 43a of the image pick-up sensor 43. The pixels 43b are two-dimensionally arranged in a matrix in a row direction (X direction) and a column direction (Y direction).

A color filter array 44 is provided on a light incident side of the image pick-up sensor 43. The color filter array 44 has a blue (B) filter 44a, a green (G) filter 44b, and a red (R) filter 44c. Any one of these filters is disposed on each pixel 43b. A color array of the color filter array 44 is a Bayer array, in which the G filter 44b is arranged in a checkered pattern every other pixel, and the B filter 44a and the R filter 44c are arranged in a square grid on the remaining pixels.

Hereinafter, the pixel 43b on which the B filter 44a is disposed will be referred to as a B pixel, the pixel 43b on which the G filter 44b is disposed will be referred to as a G pixel, and the pixel 43b on which the R filter 44c is disposed will be referred to as an R pixel. The B pixels and the G pixels are alternately arranged in each of even-numbered (0, 2, 4, . . . , and M−1) pixel rows. The G pixels and the R pixels are alternately arranged in each of odd-numbered (1, 3, 5, . . . , and M) pixel rows. Here, M is an odd-numbered positive integer, and the pixel row refers to the pixels 43b for one row arranged in the row direction. The pixel column refers to pixels 43b for one row arranged in the column direction.

Figure 11:
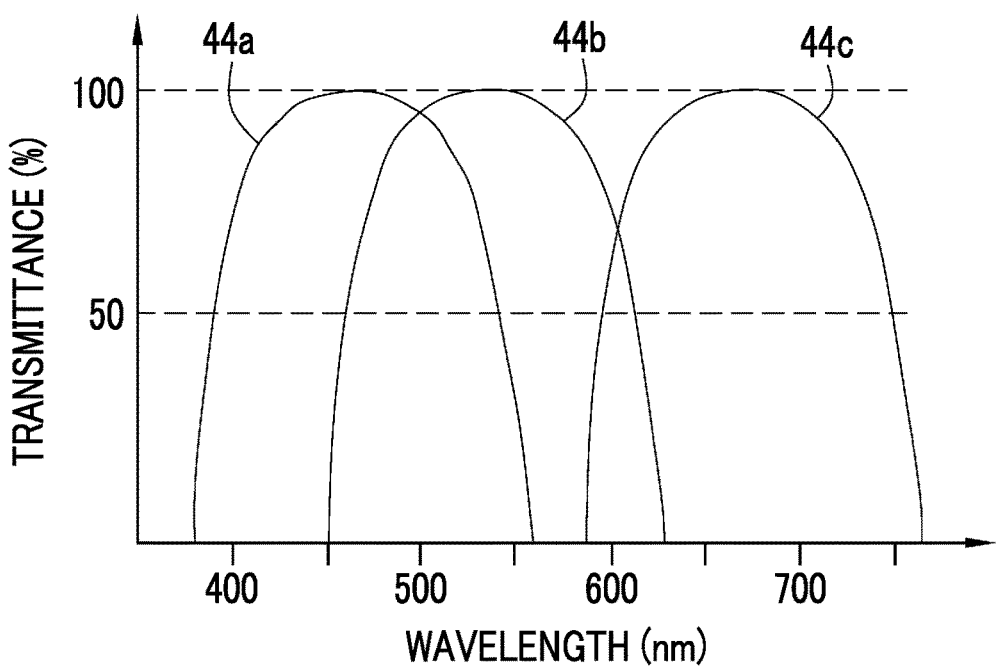
FIG. 11 is a graph showing a light transmittance of a color filter.

The color filter array 44 has spectral characteristics shown in FIG. 11. The B filter 44a has a high light transmittance for a wavelength range of, for example, 380 nm to 560 nm. The G filter 44b has a high light transmittance for a wavelength range of, for example, 450 nm to 630 nm. The R filter 44c has a high light transmittance for a wavelength range of, for example, 580 nm to 760 nm.

The image pick-up sensor 43 is driven by an image pick-up control unit 45, receives return light from an observation target illuminated by the illumination light with the plurality of pixels 43b via the color filter array 44, and outputs image signals. The image pick-up sensor 43 outputs BGR image signals including a B pixel signal, a G pixel signal, and an R pixel signal as image signals.

The CMOS image sensor generally performs an image pick-up operation according to a rolling shutter method. In the rolling shutter method, the image pick-up sensor 43 executes signal reading according to a "sequential reading method". In the sequential reading method, signal reading is sequentially performed by one pixel row from the first pixel row "0" to the last pixel row "M" for all pixels 43*b*.

The image pick-up sensor 43 can execute a "sequential reset method" and a "batch reset method" as a reset method. In the sequential reset method, resetting is sequentially performed by one pixel row from the first pixel row "0" to the last pixel row "M". In the batch reset method, all pixel rows are reset at a time at the same time.

The rolling shutter type CMOS image sensor is preferably used as the image pick-up sensor 43 in terms of cost, but the present invention is not limited to this, and a global shutter type CMOS image sensor may be used. As the image pick-up sensor 43, a charge coupled device (CCD) image sensor may be used instead of the CMOS image sensor.

Figure 12:
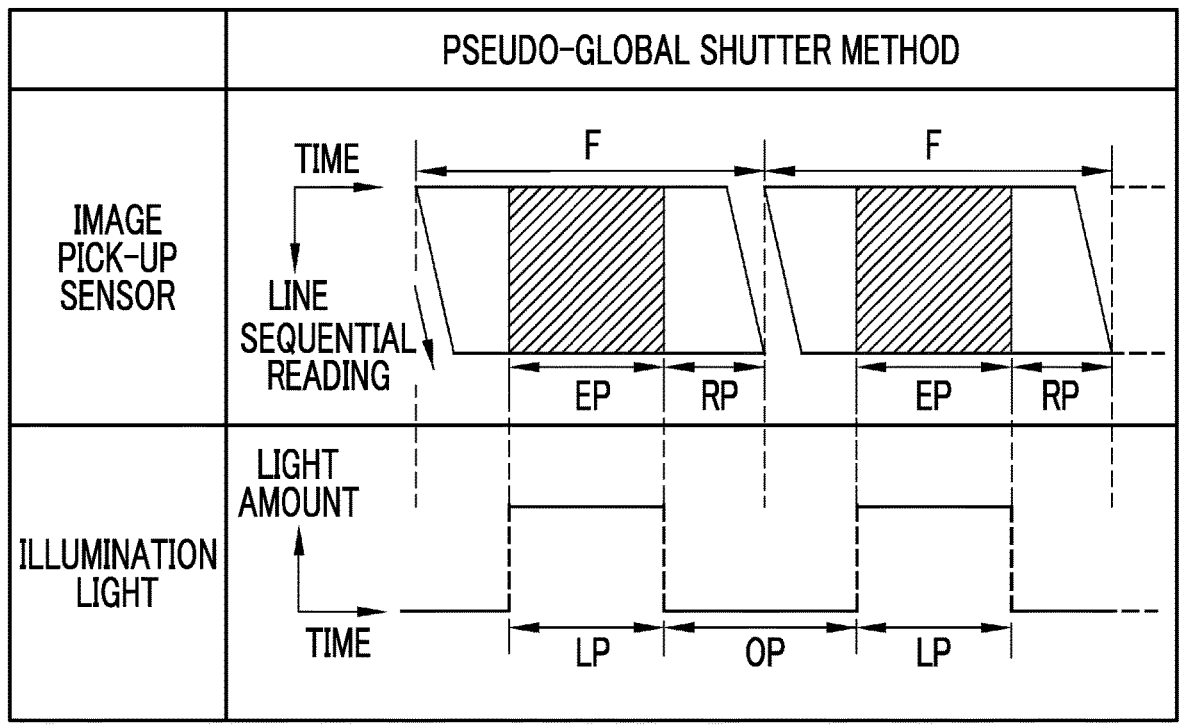
FIG. 12 is an explanatory diagram for describing a relationship between the image pick-up sensor and illumination light in a pseudo-global shutter method.

In a case of providing the image pick-up sensor 43 that performs an image pick-up operation according to the rolling shutter method of executing signal reading in the sequential reading method and performing resetting in the sequential reset method, it is preferable to perform the image pick-up operation according to a pseudo-global shutter method in which an exposure period is adjusted through pulsed emission of illumination light. As shown in FIG. 12, the pulsed emission of the illumination light means that the illumination light is emitted such that a light-off period OP is provided between the illumination period LP and the illumination period LP in which the illumination light is emitted.

The pseudo-global shutter method shown in FIG. 12 is a sequential reading method in which the pixel rows of the image pick-up sensor 43 are sequentially read with the passage of time, as indicated by an oblique line in the direction of the arrow of "sequential reading". "One frame" for acquiring one endoscopic image includes an exposure period EP in which the pixel 43*b* of each pixel row of the image pick-up sensor 43 is exposed, and a reading period RP for reading an image signal. A period up to the exposure period EP in one frame is a "period until the illumination light is emitted" and is the light-off period OP of the illumination light. In the pseudo-global shutter method, the illumination period LP is provided in accordance with the exposure period EP (hatched portion) where all the pixel rows are exposed.

By employing the pseudo-global shutter method, it is possible to suppress distortion that occurs in the vertical direction of a read image. Since the light-off period OP is provided between the illumination period LP and the illumination period LP, it is possible to eliminate color mixing associated with switching of the types of illumination light in a case where the illumination light is constantly emitted. Depending on a processing speed of the processor, a light emission amount used for the light amount control that will be described later can be calculated in the light-off period OP.

Figure 13:
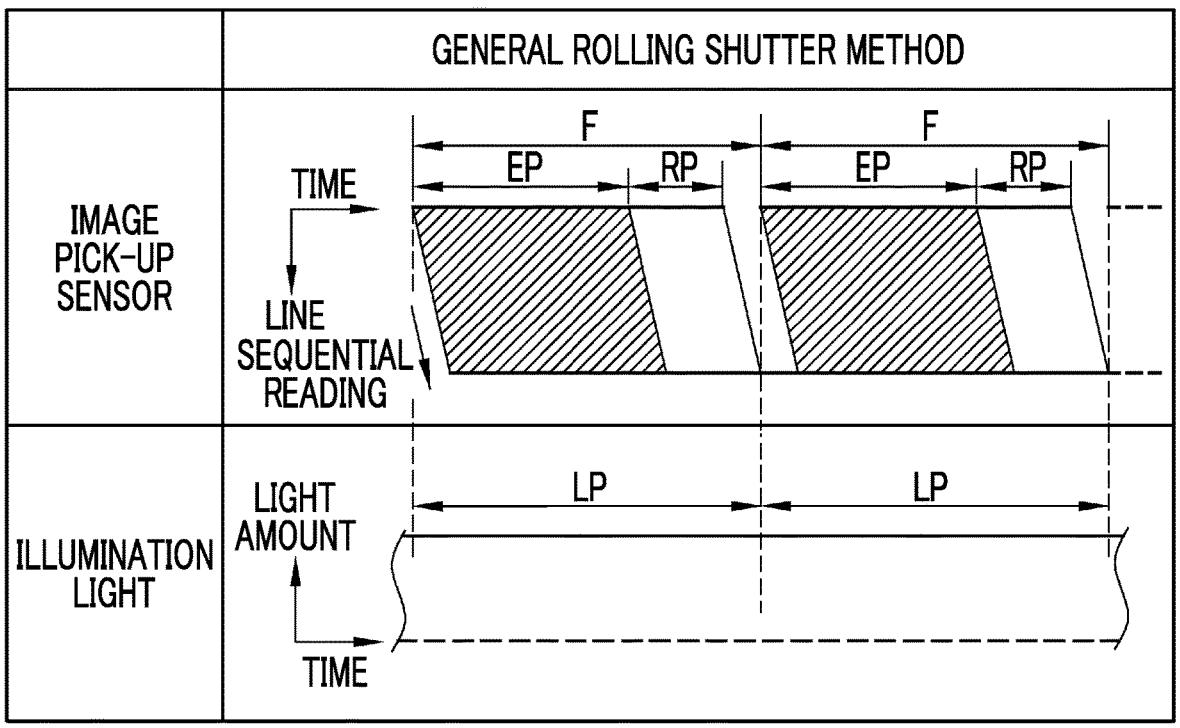
FIG. 13 is an explanatory diagram for describing a relationship between the image pick-up sensor and illumination light in a general rolling shutter method.

The image pick-up operation may be performed according to a general rolling shutter method as shown in FIG. 13. In the general rolling shutter method, light is emitted at all times while switching the types of illumination light. The image pick-up sensor 43 sequentially reads the pixel rows with the passage of time, and any one of the pixel rows is exposed at all times. In FIG. 13, the exposure period EP for each pixel row is indicated by a hatched portion. In the case of the general rolling shutter method, a period from the start of the exposure period EP of the first pixel row to the end of the reading period RP of the last pixel row is defined as "one frame".

Instead of the image pick-up sensor 43 provided with the primary color filters, a complementary image pick-up sensor provided with cyan (C), magenta (M), yellow (Y), and G (green) complementary filters may be used. In a case where a complementary image pick-up sensor is used, image signals of four colors of CMYG are output. Therefore, the same RGB image signals as in the image pick-up sensor 43 can be obtained by converting image signals of the four colors of CMYG into image signals of the three colors of RGB through complementary-primary color conversion. Instead of the image pick-up sensor 43, a monochrome sensor without a color filter may be used.

The image pick-up sensor 43 is driven and controlled by the central control unit 50 (refer to FIG. 2) via the image pick-up control unit 45. The central control unit 50 controls light emission of the light source unit 20 via the light source control unit 21 in synchronization with the drive of the image pick-up sensor 43.

An image signal is output from each pixel 43*b* by controlling the image pick-up sensor 43 so as to pick up an image of return light from an observation target illuminated with the illumination light of each type. In a case where the observation target is imaged by using the first illumination light, a Bc image signal is output from the B pixel of the image pick-up sensor 43, a Gc image signal is output from the G pixel, and an Rc image signal is output from the R pixel. In a case where the observation target is imaged by using the second illumination light, a Bs image signal is output from the B pixel of the image pick-up sensor 43, a Gs image signal is output from the G pixel, and an Rs image signal is output from the R pixel. In a case where the observation target illuminated with the third illumination light is imaged, a Bt image signal is output from the B pixel of the image pick-up sensor 43, a Gt image signal is output from the G pixel, and an Rt image signal is output from the R pixel.

A correlated double sampling/automatic gain control (CDS/AGC) circuit 46 performs correlated double sampling (CDS) or automatic gain control (AGC) on an analog image signal obtained from the image pick-up sensor 43. The image signal that has passed through the CDS/AGC circuit 46 is converted into a digital image signal by an analog/digital (A/D) converter 47. The digital image signal after A/D conversion is input to the processor device 14.

The processor device 14 includes a central control unit 50, an image signal acquisition unit 60, a digital signal processor (DSP) 61, a noise reduction unit 62, an image signal storage unit 63, an endoscopic image generation unit 70, a display control unit 80, and a light emission amount calculation unit 90, and a designated light emission amount selection unit 110 (refer to FIG. 2). In the processor device 14, a program related to each process is incorporated in a program memory (not shown). The central control unit 50 configured by a processor executes the program in the program memory to realize functions of the image signal acquisition unit 60, the DSP 61, the noise reduction unit 62, the image signal storage unit 63, the endoscopic image generation unit 70, the display control unit 80, the light emission amount calculation unit 90, and the designated light emission amount selection unit 110. Along with this, functions of a brightness calculation unit 91, a brightness difference calculation unit 92, and a light emission amount output unit 93 included in the light emission amount calculation unit 90, and functions of an emission information acquisition unit 140, scheduled emission information reception unit 150, and a light emission amount storage unit 120 included in the designated light emission amount selection unit 110 are realized.

The image signal acquisition unit 60 acquires a digital image signal input from the endoscope 12. The image signal acquisition unit 60 acquires an image signal obtained by imaging an observation target illuminated by each type of illumination light.

The acquired image signal is transmitted to the DSP 61. The DSP 61 performs digital signal processing such as a color correction process on the received image signal. The noise reduction unit 62 performs a noise reduction process based on, for example, a moving average method, or a median filter method on the image signal subjected to the color correction process or the like by the DSP 61. The image signal with reduced noise is stored in the image signal storage unit 63.

The endoscopic image generation unit 70 acquires an image signal after noise reduction from the image signal storage unit 63. The acquired image signal is subjected to signal processing such as a color conversion process, a color emphasis process, and a structure emphasis process as necessary to generate a color endoscopic image in which the observation target is captured. The endoscopic image refers to an N-th illumination light image generated from an image signal output by exposing the image pick-up sensor 43 to the N-th illumination light.

Figure 14:
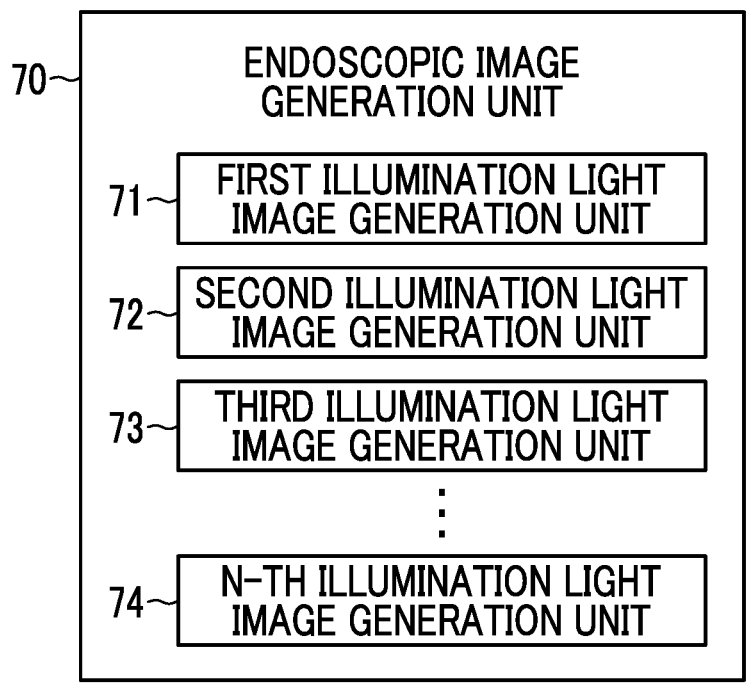
FIG. 14 is a block diagram showing a function of an endoscopic image generation unit.

As shown in FIG. 14, the endoscopic image generation unit 70 includes a first illumination light image generation unit 71, a second illumination light image generation unit 72, and a third illumination light image generation unit 73. In a case of emitting four or more types of illumination light, an N-th illumination light image generation unit 74 is provided. The endoscopic image generation unit 70 acquires an image signal from the image signal storage unit 63 according to the type of the acquired image signal, and generates each type of endoscopic image. That is, the first illumination light image generation unit 71 generates a first illumination light image, the second illumination light image generation unit 72 generates a second illumination light image, and the third illumination light image generation unit 73 generates a third illumination light image. Similarly, the N-th illumination light image generation unit 74 generates an N-th illumination light image. The N-th illumination light image generated by the endoscopic image generation unit 70 is transmitted to the display control unit 80 and the light emission amount calculation unit 90 (refer to FIG. 2).

The display control unit 80 receives the endoscopic image and performs control for displaying the endoscopic image as a display image on the display 15. The display control unit 80 generates a display image from an endoscopic image of a type designated by the central control unit 50, and outputs the display image to the display 15 to be displayed.

Hereinafter, the light amount control in the first embodiment will be described. The first embodiment is not limited to a specific light emission pattern, and is an embodiment in which the light amount control is performed according to the type of illumination light emitted in a subsequent frame from a certain frame. The endoscopic image generation unit 70 generates an endoscopic image by using illumination light emitted in a frame for calculating a light amount which is a frame at any time point.

Figure 15:
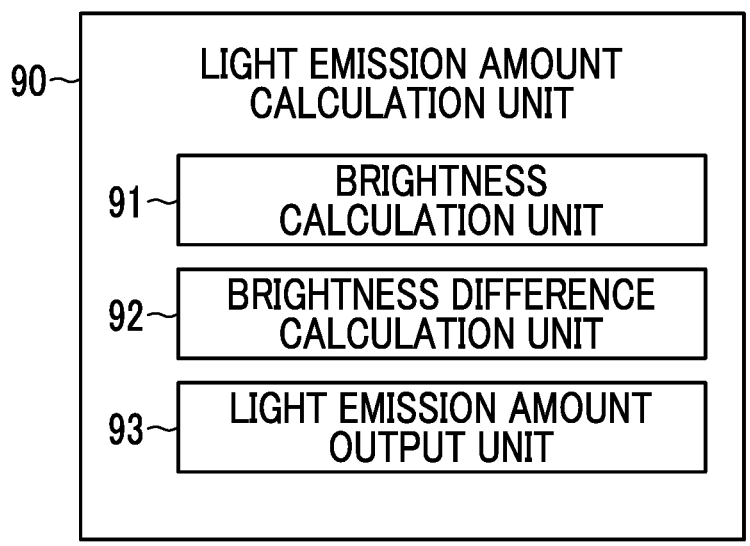
FIG. 15 is a block diagram showing a function of a light emission amount calculation unit.

The light emission amount calculation unit 90 calculates a light emission amount which is an amount of the illumination light, in which target brightness is brightness of an endoscopic image transmitted from the endoscopic image generation unit 70. As shown in FIG. 15, the light emission amount calculation unit 90 includes the brightness calculation unit 91, the brightness difference calculation unit 92, and the light emission amount output unit 93.

The brightness calculation unit 91 calculates brightness Y of the endoscopic image on the basis of a luminance value of the pixels of the endoscopic image. The brightness difference calculation unit 92 calculates a brightness difference $\Delta Y$ between the calculated brightness Y and a target brightness preset for each type of endoscopic image. The light emission amount output unit 93 outputs a light emission amount Q on the basis of the brightness difference $\Delta Y$. The light emission amount Q is associated with already emitted illumination light information to be used as a storage light emission amount, and is transmitted to the light emission amount storage unit 120 of the designated light emission amount selection unit 110 (refer to FIG. 2). The target brightness may be a fixed value or a value that varies depending on an imaging scene. A target luminance value may be set instead of the target brightness. The brightness of the endoscopic image may be calculated on the basis of a value other than the luminance value. For example, the brightness may be calculated from a relative luminance value calculated from a contrast ratio.

In a case where any type of illumination light is emitted in a scheduled emission frame that is a frame after a frame for calculating a light amount in a time series, the designated light emission amount selection unit 110 selects, as a designated light emission amount, a storage light emission amount that is the most recently calculated light emission amount from among storage light emission amounts based on the same type of illumination light as that of illumination light emitted in the scheduled emission frame among the storage light emission amounts stored in the light emission amount storage unit 120. The designated light emission amount selection unit 110 transmits the designated light emission amount to an emission instruction signal generation unit 130. The emission instruction signal generation unit 130 generates an emission instruction signal for emitting illumination light with a designated light emission amount in a scheduled emission frame and transmits the emission instruction signal to the central control unit 50. The central control unit 50 controls the light source unit 20 via the light source control unit 21 such that the illumination light to be emitted in the scheduled emission frame is emitted with the designated light emission amount on the basis of the emission instruction signal. The scheduled emission frame may be a frame immediately after the frame for calculating a light amount, or may be a frame after any number of frames.

Hereinafter, a first specific example in a case of emitting the first illumination light and the second illumination light will be described with reference to FIG. 16. A frame 100a at time point Tx1 is used as a frame for calculating a light amount. In a case where first illumination light 21a is emitted in the frame for calculating a light amount 100a, the endoscopic image generation unit 70 generates a first illumination light image 70a. Next, the light emission amount calculation unit 90 calculates a first light emission amount 90a that is a light emission amount that is an amount of the first illumination light L1 in which brightness of the first illumination light image 70a is set as first target brightness, and transmits the first light emission amount 90 to the light emission amount storage unit 120. The first light emission amount 90a is stored in the light emission amount storage unit 120 of the designated light emission amount selection unit 110 as the first storage light emission amount 120*a*.

Here, (1) a frame 100*b* at time point Tx2 is set as a scheduled emission frame. In this case, the designated light emission amount selection unit 110 selects, as the first designated light emission amount, a first storage light emission amount 121 that is the most recently calculated first storage light emission amount SQ1 from among the storage light emission amounts stored in the light emission amount storage unit 120 before the scheduled emission frame 100*b* is started, so that first illumination light 21*b* is emitted in the scheduled emission frame 100*b*, and transmits the first storage light emission amount 121 to the emission instruction signal generation unit 130. The emission instruction signal generation unit 130 generates an emission instruction signal for emitting the illumination light in the scheduled emission frame 100*b* with the first designated light emission amount (first storage light emission amount 121), and performs control via the central control unit 50 and the light source control unit 21 such that the first illumination light 21*b* is emitted with the first storage light emission amount 121 in the scheduled emission frame 100*b* to which the time point Tx2 belongs.

(2) In a case where a frame at time point Tx3 is set as a scheduled emission frame, the designated light emission amount selection unit 110 selects the first storage light emission amount 120*a* that is the latest first storage light emission amount SQ1 as the first designated light emission amount from among the storage light emission amounts, so that first illumination light 21*c* is emitted in the scheduled emission frame 100*c*. The emission instruction signal generation unit 130 generates an emission instruction signal for emitting the illumination light in the scheduled emission frame 100*c* with the first designated light emission amount (first storage light emission amount 120*a*), and performs control such that the first illumination light 21*c* is emitted with the first storage light emission amount 120*a* in the scheduled emission frame 100*c* to which the time point Tx3 belongs.

(3) In a case where a frame 100*e* at time point Tx4 is set as a scheduled emission frame, the designated light emission amount selection unit 110 selects the first storage light emission amount 120*c* that is the latest first storage light emission amount SQ1 as the first designated light emission amount from among the storage light emission amounts, so that first illumination light 21*e* is emitted in the scheduled emission frame 100*e*. The first storage light emission amount 120*c* is the first storage light emission amount SQ1 calculated and stored on the basis of the first illumination light image 70*c* emitted in the frame 100*c*. The emission instruction signal generation unit 130 generates an emission instruction signal for emitting illumination light with the first designated light emission amount (the first storage light emission amount 120*c*) in the scheduled emission frame 100*e*, and performs control such that the first illumination light 21*e* is emitted with the first storage light emission amount 120*c* in the scheduled emission frame 100*e*.

Here, although the first storage light emission amount 120*b* is stored in the light emission amount storage unit 120, the first storage light emission amount 120*b* is not selected as the first designated light emission amount because the first storage light emission amount 120*b* is not the latest first storage light emission amount SQ1.

(4) In a case where a frame at time point Tx5 is set as a scheduled emission frame, the designated light emission amount selection unit 110 selects the first storage light emission amount 120*c* that is the latest first storage light emission amount SQ1 as the first designated light emission amount from among the storage light emission amounts, so that first illumination light 21*e* is emitted in the scheduled emission frame 100*f*. The first storage light emission amount 120*c* is the first storage light emission amount SQ1 calculated and stored on the basis of the first illumination light image 70*c* emitted in the frame 100*c*. The emission instruction signal generation unit 130 generates an emission instruction signal for emitting illumination light with the first designated light emission amount (the first storage light emission amount 120*c*) in the scheduled emission frame 100*c*, and performs control such that the first illumination light 21*f* is emitted with the first storage light emission amount 120*c* in the scheduled emission frame 100*f*.

Here, since the first storage light emission amount 100*c* is the latest frame as the first storage light emission amount SQ1 at time point Tx4 and the time point Tx5, the first storage light emission amount 100*c* is selected as the first designated light emission amount for two consecutive frames such as the frame 100*e* and the frame 100*f*.

(5) In a case where a frame at time point Tx6 is set as a scheduled emission frame, the designated light emission amount selection unit 110 selects the first storage light emission amount 120*e* that is the latest first storage light emission amount SQ1 as the first designated light emission amount from among the storage light emission amounts, so that first illumination light 21*g* is emitted in the scheduled emission frame 100*g*. The first storage light emission amount 120*e* is the first storage light emission amount SQ1 calculated and stored on the basis of the first illumination light image 70*e* emitted in the frame 100*e*. The emission instruction signal generation unit 130 generates an emission instruction signal for emitting illumination light with the first designated light emission amount (first storage light emission amount 120*e*) in the scheduled emission frame 100*g*, and performs control such that the first illumination light 21*g* is emitted with the first storage light emission amount 120*e* in the scheduled emission frame 100*g*.

(6) In a case where a frame 100*h* at time point Tx7 is set as a scheduled emission frame, the designated light emission amount selection unit 110 selects the second storage light emission amount 120*d* that is the latest second storage light emission amount SQ2 as a second designated light emission amount, so that second illumination light 21*h* is emitted in the scheduled emission frame 100*h*. The second storage light emission amount 120*d* is the second storage light emission amount SQ2 calculated and stored on the basis of the second illumination light image 70*d* emitted in the frame 100*d*. The emission instruction signal generation unit 130 generates an emission instruction signal for emitting the illumination light with the second designated light emission amount (second storage light emission amount 120*d*) in the scheduled emission frame 100*h*, and performs control such that the second illumination light 21*h* is emitted with the second storage light emission amount 120*d* in the scheduled emission frame 100*h* to which the time point Tx7 belongs.

Figure 16:
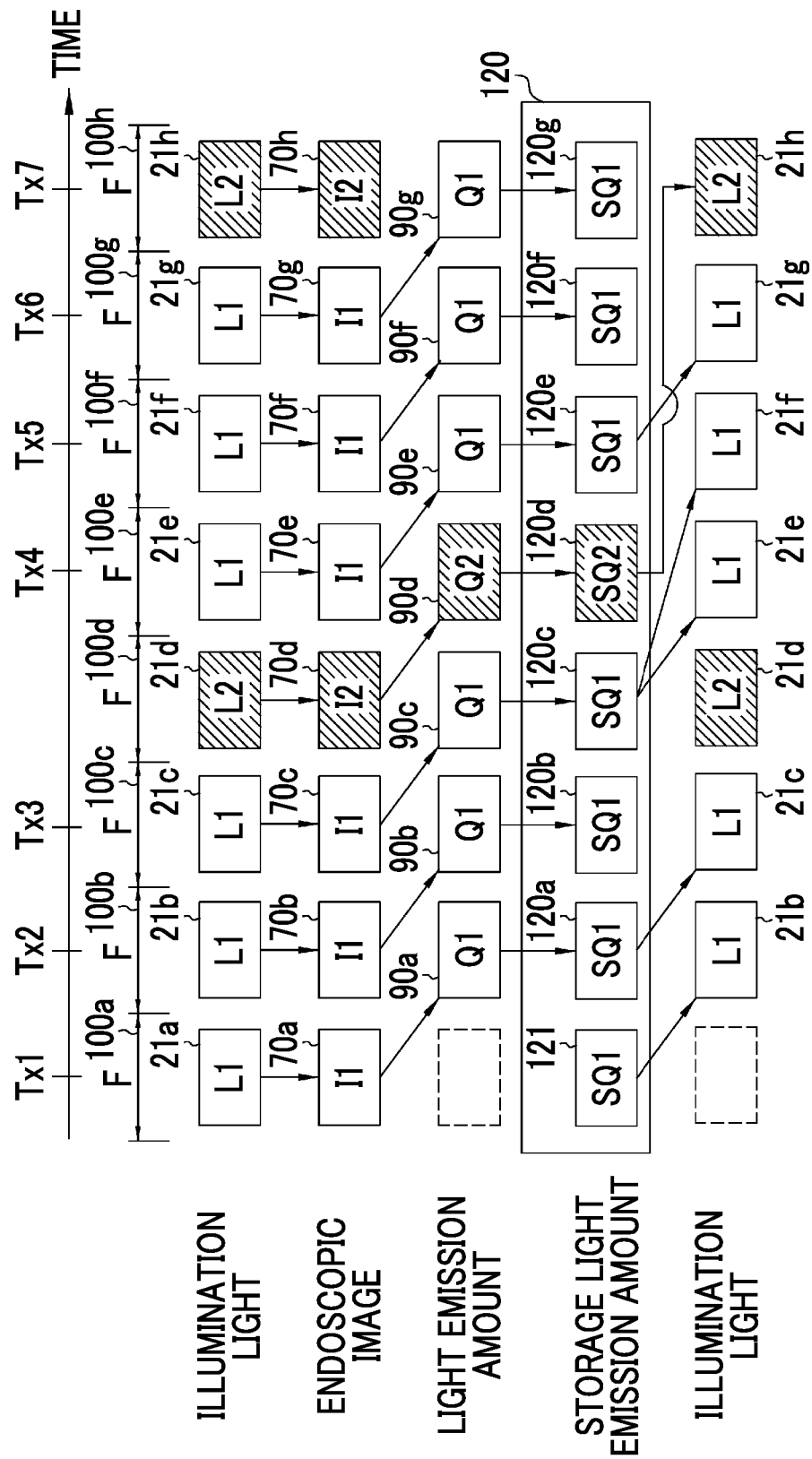
FIG. 16 is an explanatory diagram showing a specific example of light amount control in a case where the first illumination light and the second illumination light are emitted in a first embodiment.

In FIG. 16, the first light emission amount, which is a source of the first storage light emission amount 121, is shown by a box surrounded by a dotted line. Similarly to this, unless otherwise specified in the following drawings, the box surrounded by the dotted line indicates that any type of illumination light is emitted, an endoscopic image is generated, a light emission amount is calculated, a storage light emission amount is stored, past emission information that will be described later is acquired, or scheduled emission information that will be described later is acquired.

As described in the above configuration, by performing the light amount control in which a calculated light amount is temporarily stored, the latest light amount is selected from among the stored light amounts according to illumination light emitted in the future frame, and the illumination light is emitted with the selected light amount, an endoscopic image having appropriate brightness can be obtained by using the illumination light emitted in the future frame. By employing such a configuration, even in a case where a specific light emission pattern is not provided and illumination light is emitted irregularly as in the flexible light emission mode, appropriate light amount control can be performed and an endoscopic image having appropriate brightness can be obtained.

Figure 17:
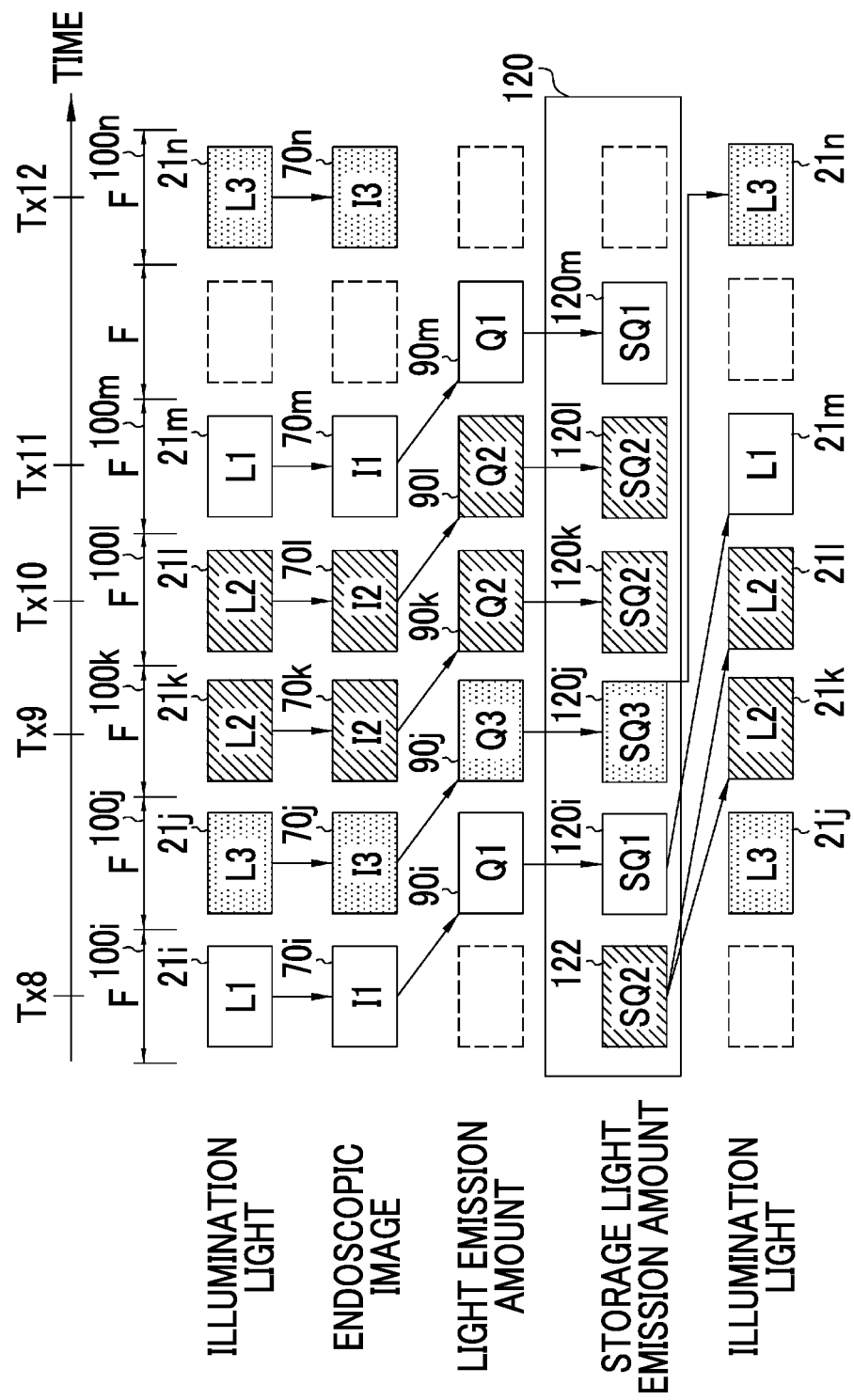
FIG. 17 is an explanatory diagram showing a specific example of light amount control in a case where the first illumination light, the second illumination light, and the third illumination light are emitted in the first embodiment.

Also in a case where three or more types of illumination light are emitted, in the same manner, a light emission amount is calculated from an endoscopic image acquired in a frame for calculating a light amount and temporarily stored, and illumination light is emitted with a designated light emission amount in a scheduled emission frame at any time point after the frame for calculating a light amount. FIG. 17 shows a second specific example in a case where the first illumination light, the second illumination light, and the third illumination light are emitted. A frame at time point Tx8 is set as a frame for calculating a light amount 100$i$. In a case where first illumination light 21$i$ is emitted in the frame for calculating a light amount 100$i$, the endoscopic image generation unit 70 generates a first illumination light image 70$i$. Next, the light emission amount calculation unit 90 calculates a first light emission amount 90$i$ that is a light emission amount that is an amount of the first illumination light L1 in which brightness of the first illumination light image 70$i$ is the first target brightness, and transmits the first light emission amount 90$i$ to the light emission amount storage unit 120. The first light emission amount 90$i$ is stored in the light emission amount storage unit 120 of the designated light emission amount selection unit 110 as a first storage light emission amount 120$i$.

Here, (7) a frame 100$k$ at time point Tx9 is set as a scheduled emission frame. In this case, the designated light emission amount selection unit 110 selects, as the second designated light emission amount, a second storage light emission amount 122 that is the most recently calculated second storage light emission amount SQ2 from among the storage light emission amounts stored in the light emission amount storage unit 120 before the scheduled emission frame 100$k$ is started, so that second illumination light 21$k$ is emitted in the scheduled emission frame 100$k$, and transmits the second storage light emission amount 122 to the emission instruction signal generation unit 130. The emission instruction signal generation unit 130 generates an emission instruction signal for emitting the illumination light in the scheduled emission frame 100$k$ with the second designated light emission amount (second storage light emission amount 122), and performs control via the central control unit 50 and the light source control unit 21 such that the second illumination light 21$k$ is emitted with the second storage light emission amount 122 in the scheduled emission frame 100$k$ to which the time point Tx9 belongs.

(8) Even in a case where a frame at time point Tx10 is set as a scheduled emission frame, the latest second storage light emission amount SQ2 is the second storage light emission amount 122. In this case as well, the designated light emission amount selection unit 110 selects the second storage light emission amount 122 as the second designated light emission amount, and the emission instruction signal generation unit 130 generates an emission instruction signal for emitting the illumination light in the scheduled emission frame 100$k$ with the second designated light emission amount (second storage light emission amount 122), and performs control such that the second illumination light 211 is emitted with the second storage light emission amount 122 in the scheduled emission frame 1001 to which the time point Tx10 belongs.

(9) In a case where a frame at time point Tx11 is set as a scheduled emission frame, the designated light emission amount selection unit 110 selects the first storage light emission amount 120$i$ that is the latest first storage light emission amount SQ1 as the first designated light emission amount from among the storage light emission amounts, so that first illumination light 21$m$ is emitted in the scheduled emission frame 100$m$. The first storage light emission amount 120$i$ is the first storage light emission amount SQ1 calculated and stored on the basis of the first illumination light image 70$i$ emitted in the frame 100$i$. The emission instruction signal generation unit 130 generates an emission instruction signal for emitting illumination light with the first designated light emission amount (first storage light emission amount 120$i$) in the scheduled emission frame 100$m$, and performs control such that the first illumination light 21$m$ is emitted with the first storage light emission amount 120$i$ in the scheduled emission frame 100$m$ to which time point Tx11 belongs.

(10) In a case where a frame at time point Tx12 is set as a scheduled emission frame, the designated light emission amount selection unit 110 selects a third storage light emission amount 120$n$ that is the latest third storage light emission amount SQ3 as a third designated light emission amount from among the storage light emission amounts, so that third illumination light 21$n$ is emitted in the scheduled emission frame 100$n$. The third storage light emission amount 120$n$ is the third storage light emission amount SQ3 calculated and stored on the basis of the third illumination light 21$j$ emitted in the frame 100$j$. The emission instruction signal generation unit 130 generates an emission instruction signal for emitting illumination light with the third designated light emission amount (third storage light emission amount 120$j$) in the scheduled emission frame 100$n$, and performs control such that the third illumination light 21$n$ is emitted with the third storage light emission amount 120$j$ in the scheduled emission frame 100$n$ to which the time point Tx12 belongs.

As described above, even though the number of types of illumination light is increased to three or more, an amount of illumination light emitted in a scheduled emission frame after a frame for calculating a light amount at any time point can be adjusted in the same manner. The types of illumination light can be increased from 2 to N ways.

It is preferable to acquire past emission information that is information indicating the type of emitted illumination light in association with the emission of the illumination light. It is preferable that the past emission information is associated with a target brightness and a parameter for calculating a light emission amount set for each type of illumination light. It is preferable that the light emission amount is calculated by using a parameter for calculating a light emission amount corresponding to the type of illumination light associated with the past emission information.

Figure 18:
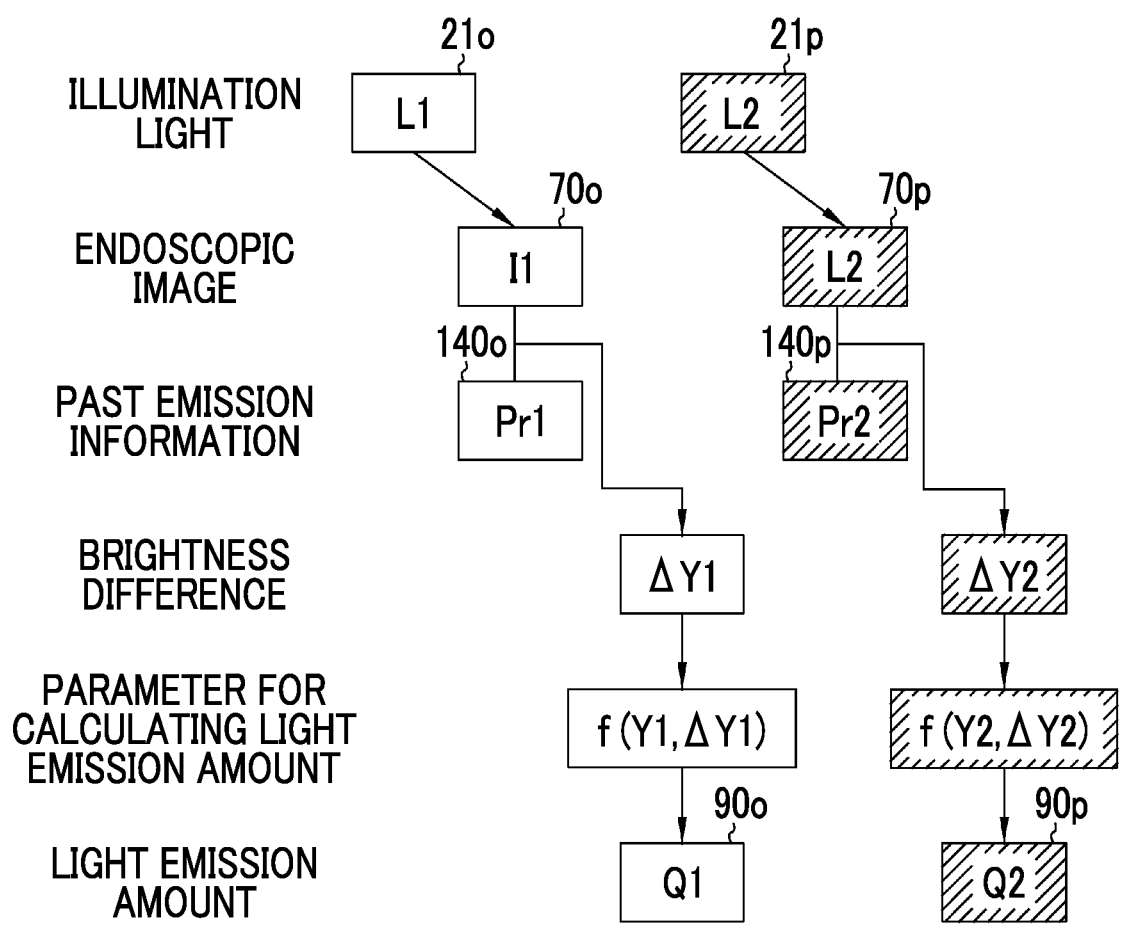
FIG. 18 is an explanatory diagram showing calculation of an light emission amount using an parameter for calculating a light emission amount.

Specifically, as shown in FIG. 18, in a case where a first light emission amount 90$o$ is calculated on the basis of a first illumination light image 70$o$ picked up by using first illumination light 21$o$, first, the emission information acquisition unit 140 acquires first past emission information Pr1 that is information indicating that the first illumination light 210 has been emitted. The first past emission information Pr1 is information associated with first target brightness and a parameter for calculating the first light emission amount. The first past emission information Pr1 is transmitted to the light emission amount calculation unit 90 (refer to FIG. 2).

Next, the light emission amount calculation unit 90 calculates a brightness difference ΔY1 from a brightness Y1 of the first illumination light image 70o and the first target brightness associated with the first past emission information Pr1. Finally, the brightness Y1 and the brightness difference ΔY1 are assigned to a parameter f(Y1, ΔY1) for calculating a light emission amount for the first illumination light associated with the first past emission information Pr1 to calculate the first light emission amount 90o.

In a case where a second light emission amount 90p is calculated on the basis of a second illumination light image 70p picked up by using second illumination light 21p, first, the emission information acquisition unit 140 acquires second past emission information Pr2 that is information indicating that the second illumination light 21p has been emitted. The second past emission information Pr2 is information associated with second target brightness and a parameter for calculating the second light emission amount. The second past emission information Pr2 is transmitted to the light emission amount calculation unit 90 (refer to FIG. 2).

The light emission amount calculation unit 90 calculates a brightness difference ΔY2 from a brightness Y2 of the second illumination light image 70p and the second target brightness associated with the second past emission information Pr2. Next, the brightness Y2 and the brightness difference ΔY2 are assigned to a parameter f(Y2, ΔY2) for calculating a light emission amount for the second illumination light associated with the second past emission information Pr2 to calculate the second light emission amount 90p.

The light emission amount may be calculated by obtaining each spectral sensitivity coefficient according to the brightness of the calculated endoscopic image without using the parameter for calculating a light emission amount in the calculation of a light emission amount. However, actually, since the number of endoscopic images picked up during an endoscopic examination is enormous, it is difficult to obtain a spectral sensitivity coefficient corresponding to the brightness of each endoscopic image. Thus, by setting in advance a parameter for calculating a light emission amount according to the type of illumination light used to pick up an endoscopic image, a calculation speed of a light emission amount required for light source control can be significantly increased, and thus a light emission amount can be calculated for each illumination period.

It is preferable that a first target brightness to an N-th target brightness are set as a target brightness according to the type of emitted illumination light, and a parameter for calculating a first light emission amount to a parameter for calculating an N-th light emission amount are set as a parameter for calculating a light emission amount.

It is preferable that scheduled emission information that is information indicating the type of illumination light emitted in a scheduled emission frame is acquired, and a designated light emission amount is selected according to the scheduled emission information. In this case, the emission information acquisition unit 140 acquires the scheduled emission information for each frame via the central control unit 50 or the like and transmits the scheduled emission information to the scheduled emission information reception unit 150 of the designated light emission amount selection unit 110.

It is preferable to store the light emission amount acquired in the frame for calculating a light amount and the past emission information in association with each other as a storage light emission amount. That is, it is preferable that the storage light emission amount is stored in a state in which it is possible to inquire for which type of illumination light is the storage light emission amount. The light emission amount output unit 93 may perform the association between the light emission amount and the past emission information, or the light emission amount calculation unit 90 may include an association unit (not shown). It is preferable that the designated light emission amount is selected on the basis of the past emission information associated with the storage light emission amount and the scheduled emission information.

In this case, first, the designated light emission amount selection unit 110 compares the type of illumination light indicated by the scheduled emission information transmitted to the scheduled emission information reception unit 150 with the type of illumination light indicated by the past emission information associated with the storage light emission amount stored in the light emission amount storage unit 120, and extracts a combination in which the type of illumination light related to the scheduled emission information and the type of illumination light related to the past emission information match. The designated light emission amount selection unit 110 selects, as the designated light emission amount, a storage light emission amount having the most recently calculated light emission amount from among the combinations.

Figure 19:
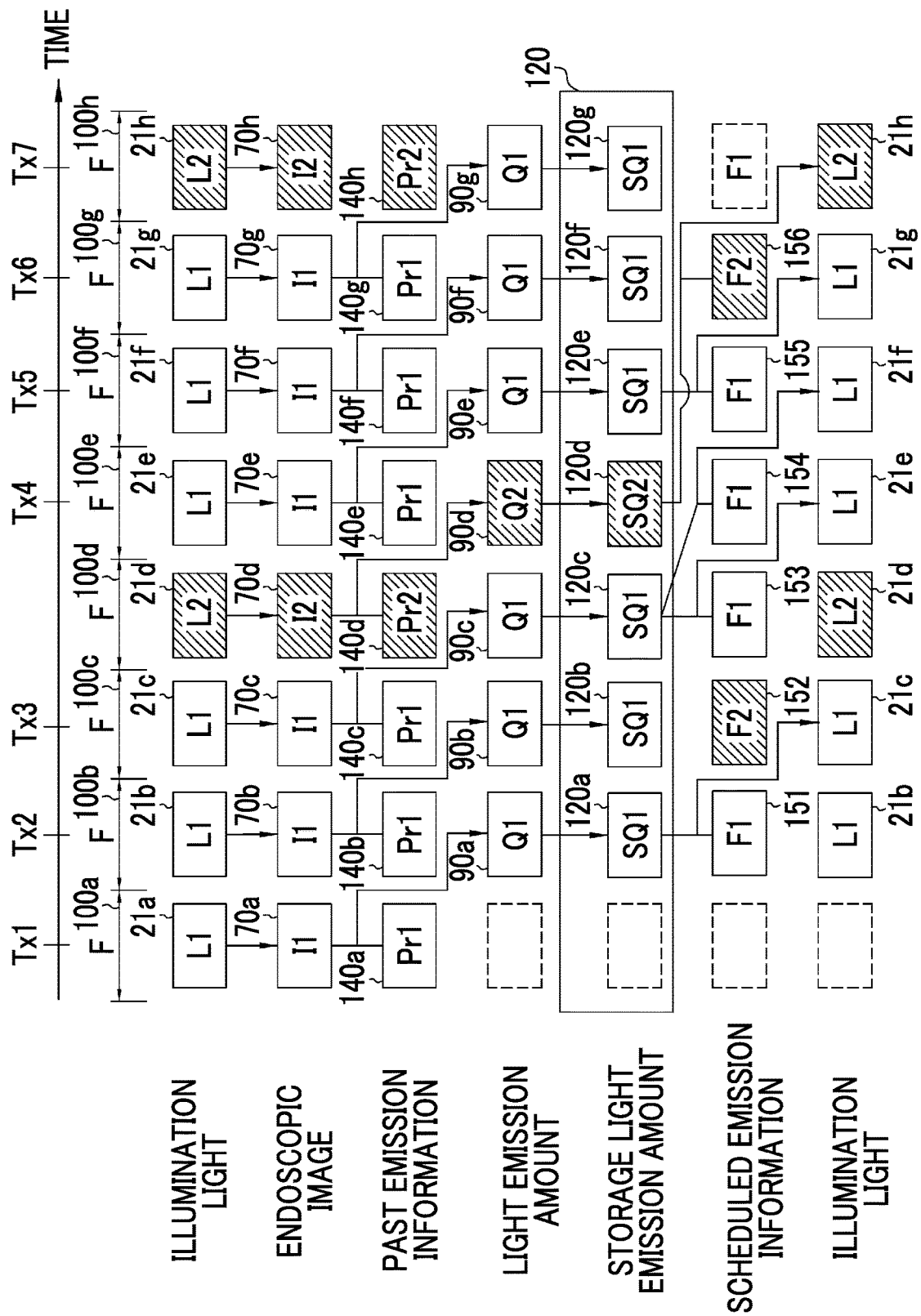
FIG. 19 is an explanatory diagram showing a specific example of light amount control in a case where scheduled emission information and past emission information are acquired and the first illumination light and the second illumination light are emitted in the first embodiment.

In the example in FIG. 16, a specific example in a case where the designated light emission amount is selected by further referring to the scheduled emission information will be described with reference to FIG. 19. In a case where the frame 100a at time point Tx1 is set as a frame for calculating a light amount, first, the first illumination light image 70a is generated, and first past emission information 140a indicating that the first illumination light 21a is emitted is acquired. Next, a first light emission amount 90a is calculated by using the first target brightness and the parameter for calculating the first light emission amount associated with the first past emission information 140a. The first light emission amount 90a is associated with the first past emission information 140a and is stored as the first storage light emission amount 120a.

(11) In a case where the frame 100c at time point Tx3 is set as a scheduled emission frame, the designated light emission amount selection unit 110 refers to the first scheduled emission information 151 indicating that the first illumination light 21c is emitted in the scheduled emission frame 100c, and selects the first storage light emission amount 120a associated with the first past emission information 140a as the first designated light emission amount from among the storage light emission amounts.

(12) In a case where the frame 100e at time point Tx4 is set as a scheduled emission frame, the designated light emission amount selection unit 110 refers to the first scheduled emission information 153 indicating that the first illumination light 21e is emitted in the scheduled emission frame 100e. Here, as the storage light emission amounts include, for example, the first storage light emission amount 120a associated with the first past emission information 140a, the first storage light emission amount 120b associated with the first past emission information 140b, and the first storage light emission amount 120c associated with the first past emission information 140c are stored. Among these, the designated light emission amount selection unit 110 selects the first storage light emission amount 120c that is the latest first storage light emission amount SQ1, as the first designated light emission amount.

(13) In a case where the frame 100f at time point Tx5 is set as a scheduled emission frame, the designated light emission amount selection unit 110 refers to first scheduled emission information 154 indicating that the first illumination light 21e is emitted in the scheduled emission frame 100f. Here, as the storage light emission amounts, for example, the first storage light emission amount 120a associated with the first past emission information 140a, the first storage light emission amount 120b associated with the first past emission information 140b, the first storage light emission amount 120c associated with the first past emission information 140c, and the second storage light emission amount 120d associated with the second past emission information 140d are stored.

The designated light emission amount selection unit 110 refers to the first scheduled emission information 154, and first, extracts the first storage light emission amount 120a, the first storage light emission amount 120b, and the first storage light emission amount 120c, which are associated with the first past emission information Pr1. Among these, the first storage light emission amount 120c that is the latest first storage light emission amount SQ1 is selected as the first designated light emission amount.

As in the above configuration, it is possible to prevent an amount of a certain type of illumination light from being used for light amount control of another type of illumination light, such as selecting a designated light emission amount from a combination that matches the type of illumination light related to past emission information associated with a storage light emission amount by referring to the type of illumination light emitted in a scheduled emission frame on the basis of scheduled emission information or using a light amount calculated from the first illumination light image for light amount control for the second illumination light.

It is preferable that past emission information indicating the type of illumination light emitted in two or more frame for calculating a light amounts is acquired, and scheduled emission information indicating the type of illumination light emitted in one or more scheduled emission frame is acquired. With the above configuration, two or more storage light emission amounts can be stored, and the light amount control can be performed by using the storage light emission amounts in a scheduled emission frame after one or more frame from a frame for calculating a light amount.

Figure 20:
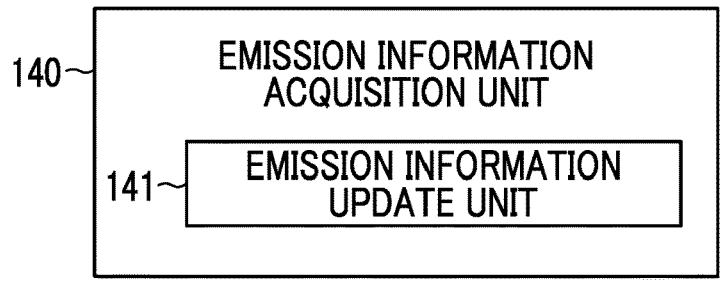
FIG. 20 is a block diagram showing a function of an emission information acquisition unit in the first embodiment.

It is preferable that the past emission information is acquired by associating the target brightness and the parameter for calculating a light emission amount with scheduled emission information acquired in a frame before the frame for calculating a light amount in a time series to update the scheduled emission information to the past emission information. In this case, as shown in FIG. 20, the emission information acquisition unit 140 is provided with an emission information update unit 141.

Figure 21:
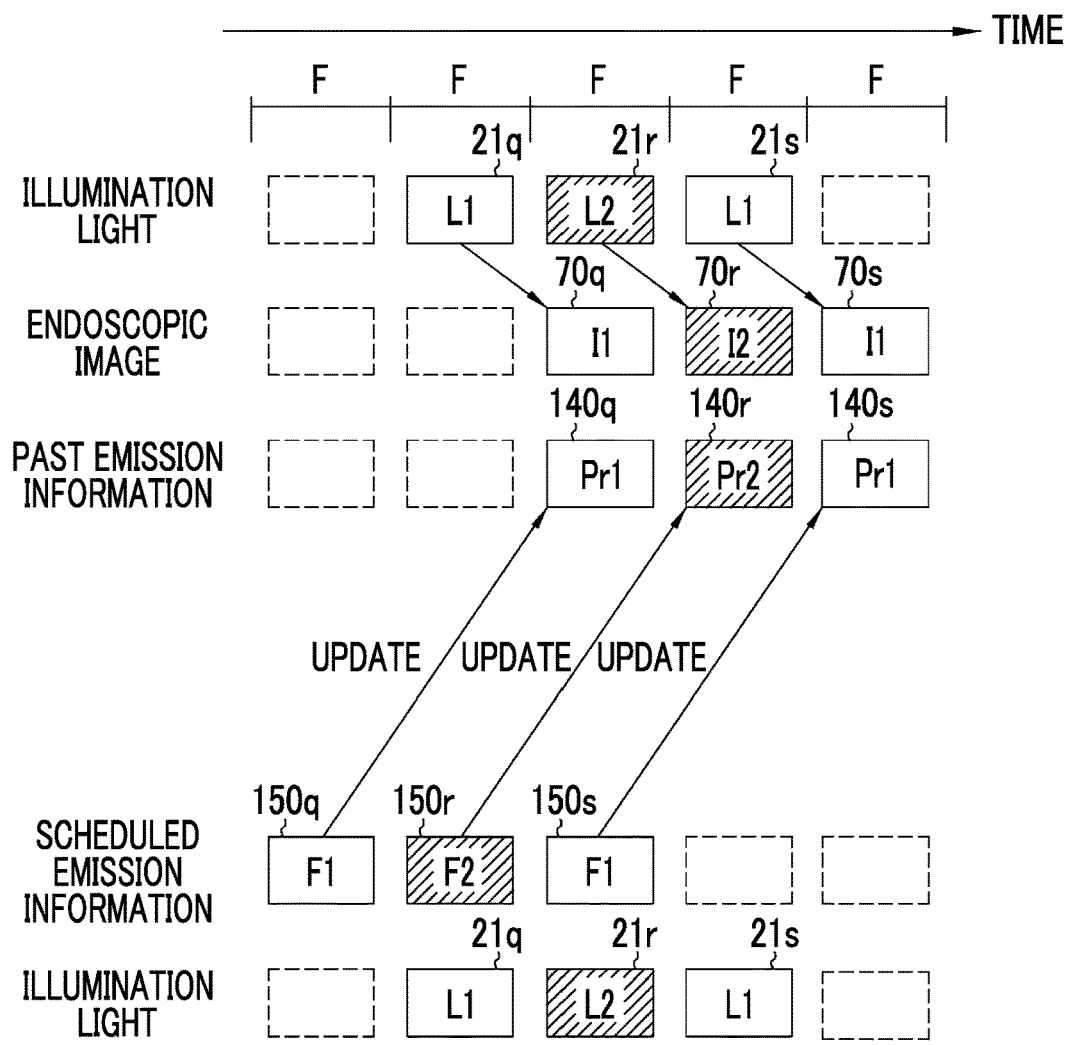
FIG. 21 is an explanatory diagram showing update from scheduled emission information to past emission information.

The emission information acquisition unit 140 transmits the scheduled emission information to the scheduled emission information reception unit 150, but stores the scheduled emission information even after that, and updates the scheduled emission information to the past emission information at a certain timing. Specifically, as exemplified in FIG. 21, the emission information update unit 141 associates the first target brightness and the parameter for calculating the first light emission amount with first scheduled emission information 157 for emitting first illumination light 21q and thus the first scheduled emission information 157 is updated to first past emission information 140q.

An update timing may be at a time at which the first illumination light 21q is emitted, at a time at which the first illumination light image 70q is generated, or at a time at which second scheduled emission information 158 for emitting the second illumination light 21r is acquired. Hereinafter, similarly, the second scheduled emission information 158 for emitting second illumination light 21r is updated to second past emission information 140r by being associated with the second target brightness and the parameter for calculating the second light emission amount. Scheduled emission information 159 for emitting first illumination light 21s is updated to past emission information 140s by being associated with the first target brightness and the parameter for calculating the first light emission amount.

With the above configuration, it is possible to acquire the past emission information each time new scheduled emission information is acquired for each frame, and it is not necessary to acquire new past emission information from the outside of the processor device 14, and a processing speed of the processor can be increased. The past emission information may be acquired by transmitting the type of illumination light emitted by the light source control unit 21 via the central control unit 50 to the emission information acquisition unit 140 at a time at which the illumination light is emitted for each frame.

Figure 22:
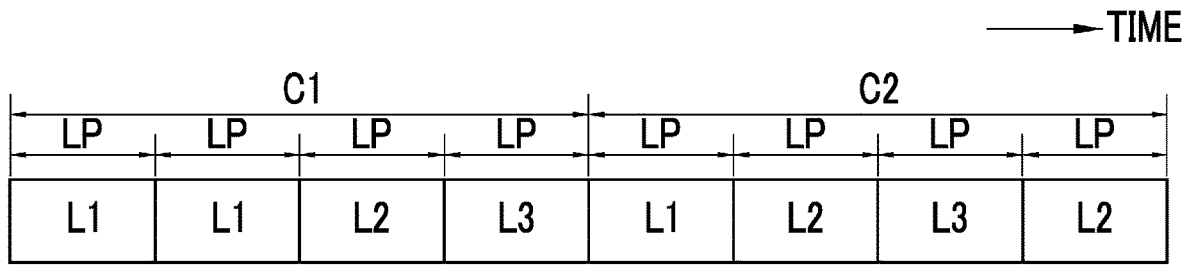
FIG. 22 is an explanatory diagram showing emission of illumination light in a case where a light emission pattern is switched.

It is preferable that the emission information acquisition unit 140 acquires scheduled emission information at a time at which a light emission mode is switched. In a case of the pattern light emission mode, it is preferable that the scheduled emission information is transmitted to the emission information acquisition unit 140 via the central control unit 50 at a time at which the light emission pattern is changed by operating the mode selector switch 12f (refer to FIG. 2). For example, in a case where the first light emission pattern is switched to the second light emission pattern (that is, in a case where the light emission cycle LC1 is switched to the light emission cycle LC2) in the pattern light emission mode, as shown in FIG. 22, a regular light emission pattern may become irregular. In this case, the type of illumination light emitted during each illumination period LP of the second light emission pattern is transmitted to the emission information acquisition unit 140 as scheduled emission information. With the above configuration, even in a case where the light emission pattern becomes irregular at a timing of switching light emission modes, the light amount control can be smoothly performed.

Figure 23:
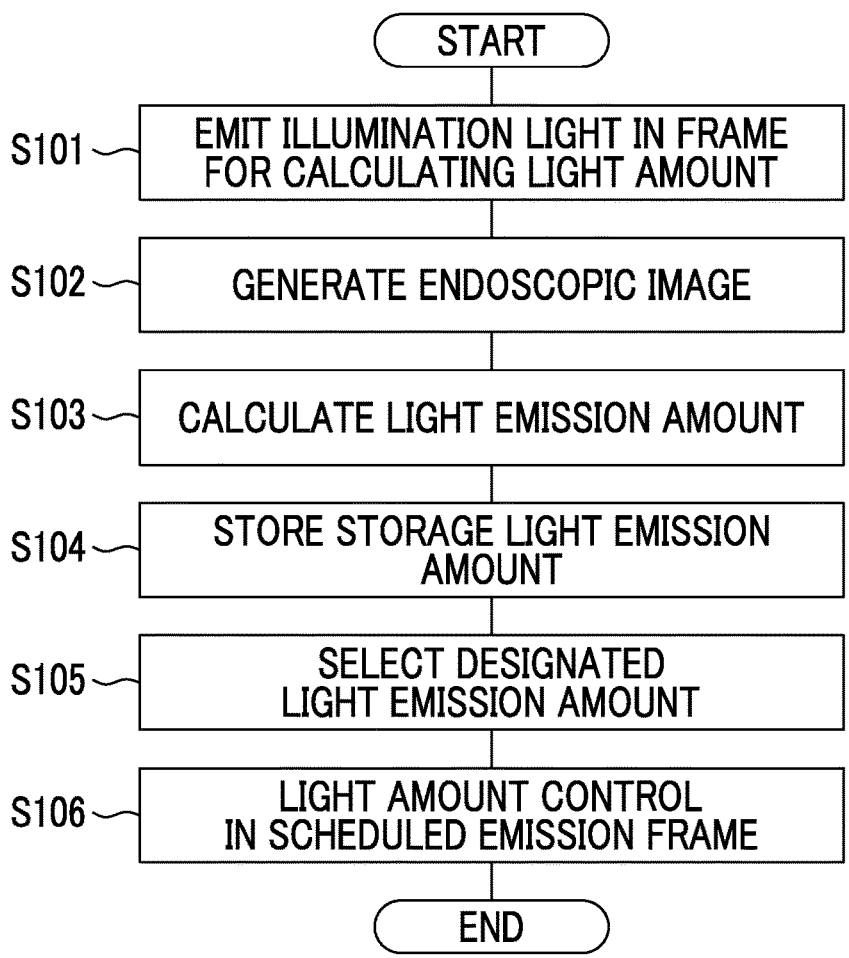
FIG. 23 is a flowchart showing a series of flows of an operation of the endoscope system in the first embodiment.

A series of flows of an operation in the endoscope system of the first embodiment will be described with reference to a flowchart of FIG. 23. First, the light source unit 20 emits a certain type of illumination light in a frame for calculating a light amount (step S101). Next, the endoscopic image generation unit 70 generates an endoscopic image from an image signal obtained by illuminating an observation target with already emitted illumination light, at any timing after the frame for calculating a light amount in a time series (step S102). Next, the light emission amount calculation unit 90 calculates a light emission amount with brightness of the endoscopic image as a target brightness (step S103). Next, the light emission amount calculation unit 90 stores the light emission amount as a storage light emission amount in the light emission amount storage unit 120 (step S104). Next, the designated light emission amount selection unit 110 selects the latest storage light emission amount as a designated light emission amount (step S105). Finally, light amount control of emitting illumination light to be emitted in a scheduled emission frame with the designated light emission amount is performed via the central control unit 50 and the light source control unit 21 (step S106).

Second Embodiment

A second embodiment is an embodiment in which illumination light is emitted according to a specific light emission pattern, unlike the first embodiment in which the illumination light is not necessarily provided with a specific light emission pattern. In the second embodiment, the endoscope system 10 has a mono-light emission mode in which one type of illumination light is emitted among a plurality of types of illumination light, and a multi-light emission mode in which a plurality of types of illumination light are switched and emitted according to a specific light emission pattern, and any light emission mode is set.

Figure 24:
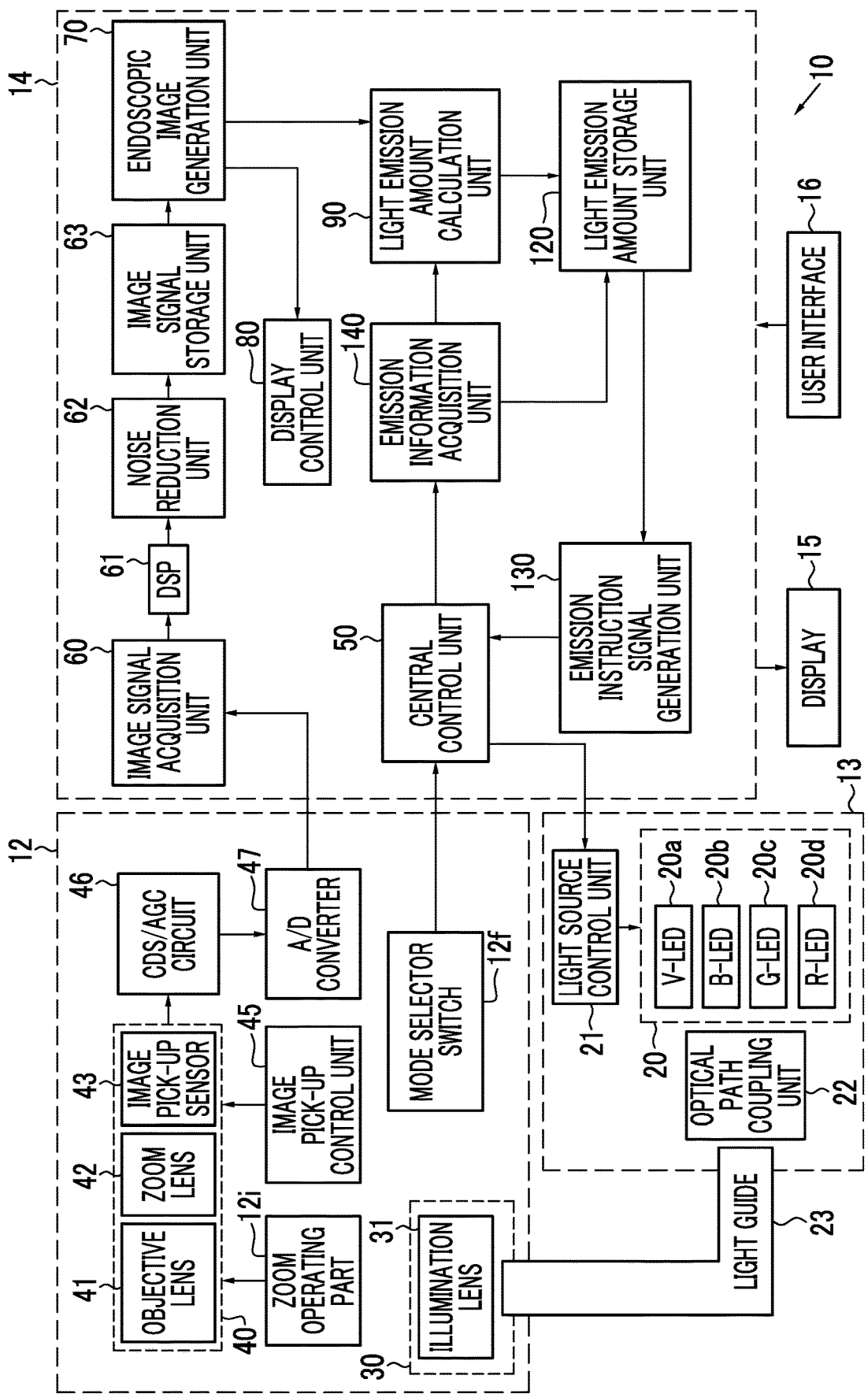
FIG. 24 is a block diagram showing a function of an endoscope system in a second embodiment.

FIG. 24 shows a function of the endoscope system according to the second embodiment. The endoscope 12, the light source device 13, the display 15, and the user interface 16 are the same as those of the first embodiment. The functions of the image signal acquisition unit 60, the DSP 61, the noise reduction unit 62, the image signal storage unit 63, and the endoscopic image generation unit 70 of the processor device 14 are the same as those of the first embodiment.

Figure 25:
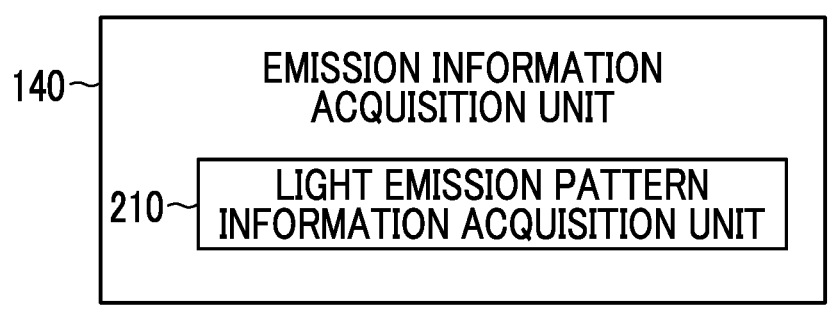
FIG. 25 is a block diagram showing a function of an emission information acquisition unit in the second embodiment.

Hereinafter, light amount control in the second embodiment will be described. In the second embodiment, light amount control is performed in which a calculated light emission amount is used in a frame after a lapse of the specific number of frames. In the second embodiment, the light emission information acquisition unit 140 includes a light emission pattern information acquisition unit 210 as shown in FIG. 25. The light emission pattern information acquisition unit 210 acquires light emission pattern information that is information indicating which type of illumination light is emitted for each frame in accordance with a set light emission mode, via the central control unit 50.

The light emission pattern information is information that determines the type of illumination light to be emitted. In the case of the mono-light emission mode, light emission pattern information is information indicating which type of illumination light is emitted among the first illumination light to the N-th illumination light in each illumination period. In the case of the multi-light emission mode, light emission pattern information is information indicating which type of illumination light is emitted in each of illumination periods of a light emission cycle with the plurality of illumination periods as the light emission cycle. For example, illumination light to be emitted is determined according to the first light emission pattern or the second light emission pattern.

The light emission pattern information acquisition unit 210 transmits the light emission pattern information to the light emission amount calculation unit 90 (refer to FIG. 24). The endoscopic image generation unit 70 transmits an endoscopic image to the light emission amount calculation unit 90. The light emission amount calculation unit 90 calculates a light emission amount that is an amount of illumination light, in which target brightness is brightness of the endoscopic image transmitted from the endoscopic image generation unit 70, on the basis of the light emission pattern information.

It is preferable that the light emission pattern information is associated with information regarding a target brightness corresponding to the type of emitted illumination light and information regarding a parameter for calculating a light emission amount. The light emission amount is calculated on the basis of the endoscopic image acquired in accordance with the light emission pattern information, the target brightness, and the parameter for calculating a light emission amount. That is, in a case where the light emission amount is referred to, the brightness calculation unit 91 of the light emission amount calculation unit 90 calculates the brightness of the endoscopic image, the brightness difference calculation unit 92 calculates the brightness difference $\Delta Y$ by using the target brightness set for each type of endoscopic image in association with the light emission pattern information, and the light emission amount output unit 93 outputs a light emission amount Q by using the parameter $f(Y, \Delta Y)$ for calculating a light emission amount corresponding to the light emission pattern information.

The calculated light emission amount Q is transmitted to the light emission amount storage unit 120 as a storage light emission amount (refer to FIG. 24). In the second embodiment, only the light emission amount storage unit 120 of the designated light emission amount selection unit 110 of the first embodiment is used.

In the second embodiment, the light emission amount storage unit 120 is further provided with a specific-number-of-frames setting unit (not shown). The light emission amount storage unit 120 temporarily stores the light emission amount as a storage light emission amount from the frame for calculating a light amount in which the illumination light is emitted to a scheduled emission frame that is a frame after a lapse of the specific number of frames set by the specific-number-of-frames setting unit.

The light emission amount storage unit 120 transmits the storage light emission amount to the emission instruction signal generation unit 130 in accordance with the light emission pattern information. The emission instruction signal generation unit 130 generates an emission instruction signal for performing control such that illumination light is emitted with the storage light emission amount in the scheduled emission frame that is a frame after a lapse of the specific number of frames from the frame for calculating a light amount, and transmits the emission instruction signal to the light source control unit 21 via the central control unit 50 such that light amount control is performed.

With the above configuration, in a case where a timing of using the calculated light amount is regular, the number of steps can be reduced compared with a case where a light emission pattern is irregular, and it is possible to smoothly perform light amount control of emitting illumination light with an amount of light at which an endoscopic image having appropriate brightness can be obtained in accordance with the type of illumination light emitted in each of illumination periods.

It is preferable that the specific number of frames is "the number of frames included in a light emission cycle" or "the number of frames from emission of a certain type of illumination light in a frame for calculating a light amount to emission of the same type of illumination light again". The specific number of frames may be the number of frames freely set in advance.

Figure 26:
FIG. 26 is an explanatory diagram showing a first specific example of light amount control in the second embodiment.

Regarding the light amount control according to the second embodiment, a first specific example showing a case where a light emission pattern in which "the first illumination light L1, the first illumination light L1, the first illumination light L1, and the second illumination light L2" are emitted is used and the number of specific frames is "the number of frames included in the light emission cycle" will be described with reference to FIG. 26.

In a case where ae frame 200a at time point Tx21 is set as a frame for calculating a light amount, the endoscopic image generation unit 70 generates a first illumination light image 270a on the basis of emitted first illumination light 221a. Next, the light emission amount calculation unit 90 calculates a first light emission amount 290a in which brightness of the first illumination light image 270a is a first target brightness included in light emission pattern information in which the first illumination light 221a is emitted (the first illumination light 221a has been emitted). In this case, it is preferable to use the parameter for calculating the first light emission amount. The first light emission amount 290a is stored in the light emission amount storage unit 120 as a first storage light emission amount 220a.

Here, the specific number of frames is "the number of frames included in the light emission cycle". In the case of FIG. 26, a light emission pattern indicated by the light emission pattern information is "the first illumination light L1, the first illumination light L1, the first illumination light L1, and the second illumination light L2", and this shows that "the first illumination light L1, the first illumination light L1, and the second illumination light L2" are emitted in the light emission cycle. In this case, "the number of frames included in the light emission cycle" is "four". Therefore, in a case where the frame 200a is set as a frame for calculating a light amount, a scheduled emission frame is a frame 200e.

In this case, the emission instruction signal generation unit 130 generates an emission instruction signal for performing control such that the first illumination light 221e is emitted with the first storage light emission amount 220a in the scheduled emission frame 200e that is a frame after a lapse of the specific number of frames from the frame for calculating a light amount 200a, and transmits the emission instruction signal to the light source control unit 21 via the central control unit 50 such that light amount control is performed.

Hereinafter, in the same manner, in a case where a frame 200b at time point Tx22 is set as a frame for calculating a light amount, light amount control is performed such that first illumination light 221f is emitted with a first storage light emission amount 220b in a scheduled emission frame 200f that is a frame after a lapse of the specific number of frames.

In a case where a frame 200c at time point Tx23 is set as a frame for calculating a light amount, light amount control is performed such that first illumination light 221g is emitted with a first storage light emission amount 220c in a scheduled emission frame 200g that is a frame after a lapse of the specific number of frames.

In a case where a frame 200d at time point Tx24 is set as a frame for calculating a light amount, light amount control is performed such that second illumination light 221h is emitted with a second storage light emission amount 220d in a scheduled emission frame 200h that is a frame after a lapse of the specific number of frames.

With the above configuration, the calculated light emission amount can be used for periodic light amount control. A method of determining a timing at which the calculated light emission amount is used on the basis of the number of frames included in the light emission cycle is effective from the viewpoint of time until the calculated light emission amount is reflected, particularly in a case where the number of illumination periods included in one light emission cycle is small. In the same manner as in the first embodiment, the type of illumination light may be the first illumination light to the N-th illumination light.

Figure 27:
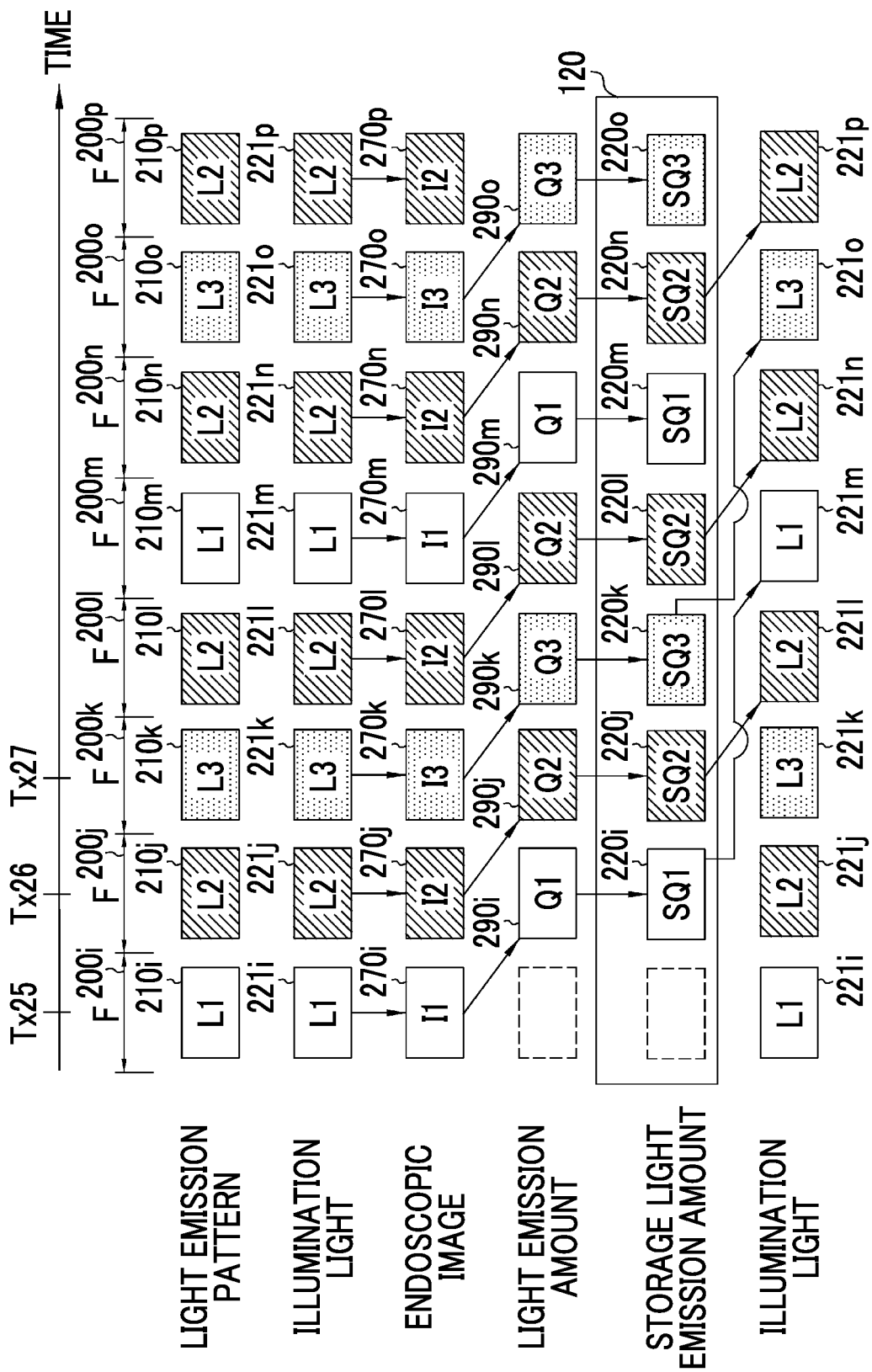
FIG. 27 is an explanatory diagram showing a second specific example of light amount control in the second embodiment.

Regarding the light amount control in the second embodiment, a second specific example showing a case where a light emission pattern in which "the first illumination light L1, the second illumination light L2, the third illumination light L3, and the second illumination light L2" are emitted is used and the specific number of frames is "the number of frames from emission of a certain type of illumination light in a frame for calculating a light amount to emission of the same type of illumination light again" will be described with reference to FIG. 27.

In a case where a frame 200i at time point Tx25 is set as a frame for calculating a light amount, the endoscopic image generation unit 70 generates a first illumination light image 270i on the basis of emitted first illumination light 221i. Next, the light emission amount calculation unit 90 calculates a first light emission amount 290i in which brightness of the first illumination light image 270i is a first target brightness included in light emission pattern information in which the first illumination light 221i is emitted (the first illumination light 221i has been emitted). In this case, it is preferable to use the parameter for calculating the first light emission amount. The first light emission amount 290i is stored in the light emission amount storage unit 120 as a first storage light emission amount 220i.

Here, the specific number of frames is "the number of frames from emission of a certain type of illumination light in a frame for calculating a light amount to emission of the same type of illumination light again". In the case of FIG. 27, a light emission pattern indicated by the light emission pattern information is "the first illumination light L1, the second illumination light L2, the third illumination light L3, and the second illumination light L2". In this case, the "number of frames from emission of the first illumination light in the frame for calculating a light amount to emission of the first illumination light" is "four" from the frame 200i to the frame 200m. In addition, "the number of frames from emission of the second illumination light in the frame for calculating a light amount to emission of the second illumination light" is "two" from the frame 200j to the frame 200l. Further, "the number of frames from emission of the third illumination light in the frame for calculating a light amount to emission of the third illumination light" is "four" from the frame 200k to the frame 200o.

In this case, the emission instruction signal generation unit 130 generates an emission instruction signal for performing control such that the first illumination light 221m is emitted with the first storage light emission amount 220i in the scheduled emission frame 200m that is a frame after a lapse of the specific number of frames from the frame for calculating a light amount 200i, and transmits the emission instruction signal to the light source control unit 21 via the central control unit 50 such that light amount control is performed.

Hereinafter, in the same manner, in a case where the frame 200j at time point Tx26 is set as a frame for calculating a light amount, light amount control is performed such that the second illumination light 221l is emitted with the second storage light emission amount 220j in the scheduled emission frame 200l that is a frame after a lapse of the specific number of frames.

In a case where the frame 200k at time point Tx27 is set as a frame for calculating a light amount, light amount control is performed such that the third illumination light 221o is emitted with the second storage light emission amount 220k in the scheduled emission frame 200o that is a frame after a lapse of the specific number of frames.

With the above configuration, the calculated light emission amount can be used for periodic light amount control. A method of determining a timing of using the calculated light emission amount on the basis of the number of frames until the same type of illumination light as the illumination light emitted once is emitted is effective from the viewpoint of time until the calculated light emission amount is reflected in a case where the number of illumination periods included in one light emission cycle (the number of frames included in one light emission pattern) is large, but the same type of illumination light is frequently emitted in one light emission cycle. Depending on a processing speed of the processor, the method is also effective in a case where the same type of illumination light is consecutively emitted.

Figure 28:
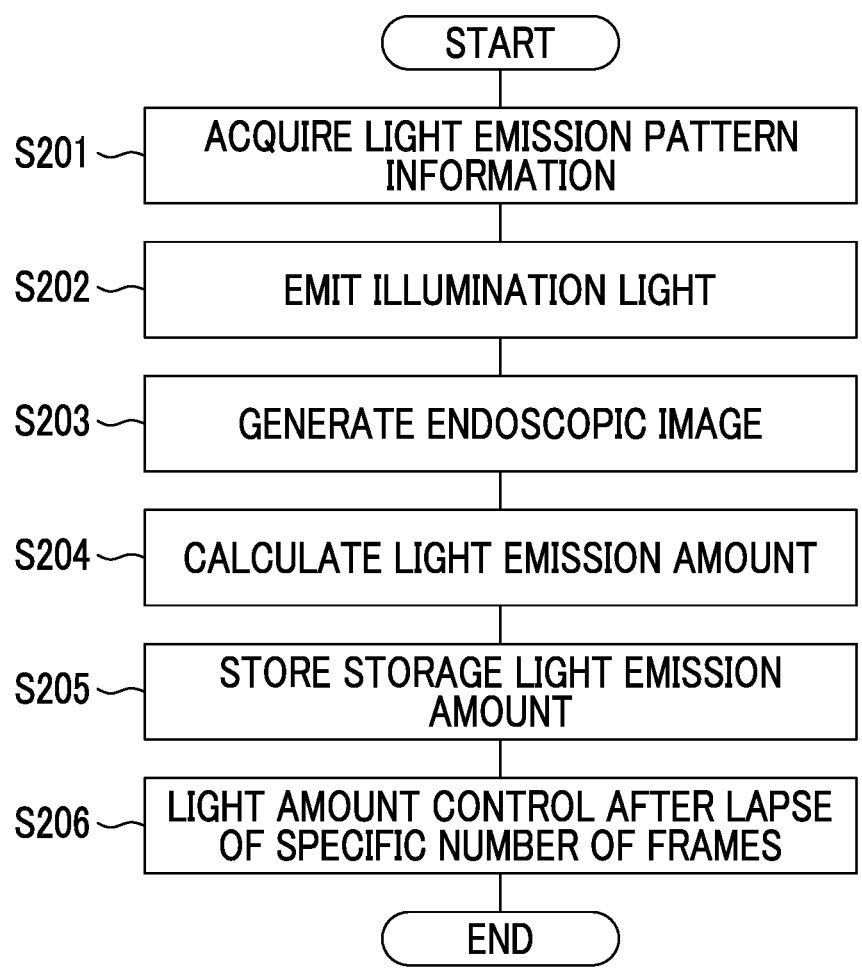
FIG. 28 is a flowchart showing a series of flows of an operation of the endoscope system in the second embodiment.

A series of flows of an operation in the endoscope system of the second embodiment will be described with reference to a flowchart of FIG. 28. First, the light emission pattern information acquisition unit 210 of the light emission information acquisition unit 140 acquires light emission pattern information (step S201). Next, the light source unit 20 emits a certain type of illumination light in a frame for calculating a light amount (step S202). Next, the endoscopic image generation unit 70 generates an endoscopic image (step S203). Next, the light emission amount calculation unit 90 calculates a light emission amount in which brightness of the endoscopic image is a target brightness (step S204). Next, the light emission amount calculation unit 90 stores the light emission amount as a storage light emission amount in the light emission amount storage unit 120 (step S205). Finally, light amount control is performed such that illumination light emitted in a scheduled emission frame that is a frame after a lapse of a specific number of frames from the frame for calculating a light amount is emitted with the storage light emission amount via the central control unit 50 and the light source control unit 21 (step S206).

It is preferable that the image pick-up sensor 43 in the second embodiment is the image pick-up sensor 43 that performs image pick-up according to the pseudo-global shutter method in the same manner as in the first embodiment. The image pick-up sensor 43 that performs image pick-up according to a general rolling shutter method may be used.

In the above embodiments, hardware structures of processing units executing various processes, such as the central control unit 50, the image signal acquisition unit 60, the DSP 61, the noise reduction unit 62, the image signal storage unit 63, the endoscopic image generation unit 70, the display control unit 80, the light emission amount calculation unit 90, and the designated light emission amount selection unit 110 are various processors as described below. The various processors include a central processing unit (CPU) and/or a graphical processing unit (GPU) that is a general-purpose processor that executes software (program) to function as various processing units, a programmable logic device (PLD) such as a field programmable gate array (FPGA) of which a circuit configuration is changed after being manufactured, a dedicated electric circuit that is a processor having a circuit configuration specially designed to execute various processes, and the like.

One processing unit may be configured with one of these various processors, or may be configured with a combination of two or more processors of the same type or different types (for example, a combination of a plurality of FPGAs, a combination of a CPU and an FPGA, or a combination of a CPU and a GPU). A plurality of processing units may be configured by one processor. As an example of configuring a plurality of processing units with one processor, first, there is a form in which one processor is configured by a combination of one or more CPUs and software, as typified by a computer used for a client or a server, and this processor functions as a plurality of processing units. Second, as typified by system on chip (SoC), there is a form in which a processor that realizes functions of the entire system including a plurality of processing units with one integrated circuit (IC) chip is used. As described above, the various processing units are configured by using one or more of the above various processors as a hardware structure.

The hardware structure of these various processors is, more specifically, an electric circuit (circuitry) in which circuit elements such as semiconductor elements are combined. A hardware structure of the storage unit is a storage device such as a hard disk drive (HDD) or a solid state drive (SSD).

EXPLANATION OF REFERENCES

10: endoscope system
12: endoscope
12a: insertion part
12b: operating part
12c: bendable part
12d: tip part
12e: angle knob
12f: mode selector switch
12i: zoom operating part
12j: forceps port
13: light source device
14: processor device
15: display
16: user interface
20: light source unit
20a: V-LED
20b: B-LED
20c: G-LED
20d: R-LED
21: light source control unit
21a, 21b, 21c, 21d, 21e, 21f, 21g, 21h, 21i, 21j, 21k, 21l, 21m, 21n, 21o, 21p, 21q, 21r, 21s, 221a, 221b, 221c, 221d, 221e, 221f, 221g, 221h, 221i, 221j, 221k, 221l, 221m, 221n, 221o, 221p: illumination light
22: optical path coupling unit
23: light guide
30 illumination optical system
31: illumination lens
40: image pick-up optical system
41: objective lens
42: zoom lens
43: image pick-up sensor
43a: image pick-up surface
43b: pixels
44: color filter array
44a: blue filter
44b: green filter
44c: red filter
45: image pick-up control unit
46: CDS/AGC circuit
47: A/D converter
50: central control unit
60 image signal acquisition unit
61: DSP
62: noise reduction unit
63: image signal storage unit
70: endoscopic image generation unit
70a, 70b, 70c, 70d, 70e, 70f, 70g, 70h, 70i, 70j, 70k, 70l, 70m, 70n, 70o, 70p, 70q, 70r, 70s, 270a, 270b, 270c, 270d, 270e, 270f, 270g, 270h, 270i, 270j, 270k, 2701, 270m, 270n, 270o, 221p: endoscopic image 71: first illumination light image generation unit
72: second illumination light image generation unit
73: third illumination light image generation unit
74: N-th illumination light image generation unit
80: display control unit
90: light emission amount calculation unit
90a, 90b, 90c, 90d, 90e, 90f, 90g, 90i, 90j, 90k, 90l, 90m, 90o, 90p, 290a, 290b, 290c, 290d, 290e, 290f, 290g, 290i, 290j, 290k, 290l, 290m, 290n, 290o: light emission amount
91: brightness calculation unit
92: brightness difference calculation unit
93: light emission amount output unit
100a, 100b, 100c, 100d, 100e, 100f, 100g, 100h, 100i, 100j, 100k, 100l, 100m, 100n, 200a, 200b, 200c, 200d, 200e, 200f, 200g, 200h, 200i, 200j, 200k, 200l, 200m, 200n, 200o, 200p:frame
110: designated light emission amount selection unit
120: light emission amount storage unit
120a, 120b, 120c, 120d, 120e, 120f, 120g, 120i, 120j, 120k, 120l, 120m, 121, 122, 220a, 220b, 220c, 220d, 220e, 220f, 220g, 220i, 220j, 220k, 220l, 220m, 220n, 220o: storage light emission amount
130: emission instruction signal generation unit
140: emission information acquisition unit
140a, 140b, 140c, 140d, 140e, 140f, 140g, 140h, 140o, 140p, 140q, 140r, 140s: past emission information
141: emission information update unit
150: scheduled emission information reception unit
150q, 150r, 150s, 151, 152, 153, 154, 155, 156: scheduled emission information
210: light emission pattern information acquisition unit

What is claimed is:

1. An endoscope system comprising:
an endoscope that picks up an image of an observation target;
a light source device that emits first illumination light and second illumination light having a spectrum different from a spectrum of the first illumination light; and
a processor, configured to:
acquire past emission information by transmitting a type of emitted illumination light from a light source control unit to an emission information acquisition unit, the units being run by the processor, at a time of emission for each frame, the processor being configured to associate the type of emitted illumination light with a specific storage light emission amount from among storage light emission amounts;
generate a first illumination light image obtained by picking up an image of the observation target by using the first illumination light or a second illumination light image obtained by picking up an image of the observation target by using the second illumination light, in a frame for calculating a light amount;
calculate a first light emission amount that is outputted on the basis of a brightness difference between brightness of the first illumination light image and a first target brightness and a second light emission amount that is outputted on the basis of a brightness difference between brightness of the second illumination light image and a second target brightness different from the first target brightness at any timing after the frame for calculating a light amount in a time series;
store the first light emission amount as a first storage light emission amount of the storage light emission amounts;
store the second light emission amount as a second storage light emission amount of the storage light emission amounts;
select, in a case where the first illumination light is emitted in a scheduled emission frame after the frame for calculating a light amount in a time series based on the past emission information acquired at the time of emission for each frame, the latest first storage light emission amount as a first designated light emission amount from among one or more first storage light emission amounts;
select, in a case where the second illumination light is emitted in the scheduled emission frame based on the past emission information acquired at the time of emission for each frame, the latest second storage light emission amount as a second designated light emission amount from among one or more second storage light emission amounts; and
cause the light source device to emit the first illumination light with the first designated light emission amount or the second illumination light with the second designated light emission amount in the scheduled emission frame.

2. The endoscope system according to claim 1,
wherein the past emission information includes first past emission information that is information indicating that the first illumination light is emitted in the frame for calculating a light amount and associated with the first target brightness and a parameter for calculating the first light emission amount, and second past emission information that is information indicating that the second illumination light is emitted in the frame for calculating a light amount and associated with the second target brightness and a parameter for calculating the second light emission amount, and
the processor is further configured to:
calculate the first light emission amount by using the parameter for calculating the first light emission amount associated with the first past emission information; and
calculate the second light emission amount by using the parameter for calculating the second light emission amount associated with the second past emission information.

3. The endoscope system according to claim 2,
wherein the processor is further configured to:
set the first storage light emission amount by associating the first light emission amount with the first past emission information;
set the second storage light emission amount by associating the second light emission amount with the second past emission information;
acquire first scheduled emission information that is information indicating that the first illumination light is emitted in the scheduled emission frame, or second scheduled emission information that is information indicating that the second illumination light is emitted in the scheduled emission frame;
select, in a case where the first scheduled emission information is acquired, the first designated light emission amount from among the first storage light emission amounts associated with the first past emission information; and
select, in a case where the second scheduled emission information is acquired, the second designated light emission amount from among the second storage light emission amounts associated with the second past emission information.

4. The endoscope system according to claim 3, wherein the processor is further configured to acquire the first past emission information or the second past emission information related to the frame for calculating a light amount for two or more frame for calculating a light amounts, and acquire the first scheduled emission information or the second past emission information related to the scheduled emission frame for one or more scheduled emission frame.

5. The endoscope system according to claim 3, wherein the processor is further configured to:
associate the first target brightness and the parameter for calculating the first light emission amount with the first scheduled emission information acquired before the frame for calculating a light amount in a time series, and acquire the first past emission information by updating the first scheduled emission information to the first past emission information indicating that the first illumination light has been emitted in the frame for calculating a light amount; and
associate the second target brightness and the parameter for calculating the second light emission amount with the second scheduled emission information acquired before the frame for calculating a light amount in a time series, and acquires the second past emission information by updating the second scheduled emission information to the second past emission information indicating that the second illumination light has been emitted in the frame for calculating a light amount.

6. The endoscope system according to claim 3, wherein the processor is further configured to:
switch a mono-light emission mode in which only the first illumination light or the second illumination light is emitted from the light source device, a pattern light emission mode in which the first illumination light and the second illumination light are emitted from the light source device according to a specific light emission pattern, and a flexible light emission mode in which the first illumination light and the second illumination light are irregularly emitted from the light source device; and
acquire the first scheduled emission information or the second scheduled emission information at a timing at which each of the mono-light emission mode, the pattern light emission mode, and the flexible light emission mode is switched.

7. The endoscope system according to claim 6, wherein the processor is further configured to acquire, in a case of the pattern light emission mode, the first scheduled emission information or the second scheduled emission information at a timing at which the specific light emission pattern is changed.

8. The endoscope system according to claim 1, wherein the light source device emits three or more types of illumination light for picking up an image of the observation target in the frame for calculating a light amount, and
the processor is further configured to:
acquire three or more types of endoscopic images obtained by picking up an image of the observation target;
calculate a light emission amount that is an amount of the illumination light for setting brightness of the three or more types of endoscopic images to a target brightness;
store the light emission amount as another storage light emission amount;
select a designated light emission amount from among one or more storage light emission amounts according to the type of the illumination light emitted in the scheduled emission frame; and
cause the light source device to emit three or more types of the illumination light with the designated light emission amount in the scheduled emission frame.

9. The endoscope system according to claim 8, wherein the processor is further configured to:
calculate a brightness on the basis of a luminance value of the endoscopic image; and
calculate the light emission amount by using the brightness.

10. An endoscope system comprising:
an endoscope that picks up an image of an observation target;
a light source device that emits first illumination light and second illumination light having a spectrum different from a spectrum of the first illumination light according to a specific light emission pattern; and
a processor configured to:
acquire past emission information by transmitting a type of emitted illumination light from a light source control unit to an emission information acquisition unit, the units being run by the processor, at a time of emission for each frame, the processor being configured to associate the type of emitted illumination light with a specific storage light emission amount from among storage light emission amounts;
acquire a first illumination light image obtained by picking up an image of the observation target by using the first illumination light or a second illumination light image obtained by picking up an image of the observation target by using the second illumination light, in a frame for calculating a light amount;
calculate a first light emission amount that is outputted on the basis of a brightness difference between brightness of the first illumination light image and a first target brightness or a second light emission amount that is outputted on the basis of a brightness difference between brightness of the second illumination light image and a second target brightness different from the first target brightness, from a frame for calculating a light amount to a scheduled emission frame that is a frame after a lapse of a specific number of frames;
store the first light emission amount as a first storage light emission amount of the storage light emission amounts;
store the second light emission amount as a second storage light emission amount of the storage light emission amounts; and
cause the light source device to emit the first illumination light with the first storage light emission amount or the second illumination light with the second storage light emission amount in the scheduled emission frame.

11. The endoscope system according to claim 10,
wherein the specific light emission pattern is a light emission cycle consisting of one or more illumination periods that are periods during which the first illumination light or the second illumination light is emitted, and
the specific number of frames is a number matching the number of the illumination periods included in the light emission cycle.

12. The endoscope system according to claim 10, wherein the specific number of frames is the number of frames from emission of the first illumination light in the frame for calculating a light amount to emission of the first illumination light, or the number of frames from emission of the second illumination light in the frame for calculating a light amount to emission of the second illumination light.

13. The endoscope system according to claim 1, further comprising an image pick-up sensor that picks up an image of the observation target according to a pseudo-global shutter method.

14. The endoscope system according to claim 12, further comprising an image pick-up sensor that picks up an image of the observation target according to a pseudo-global shutter method.

15. An operation method for an endoscope system, comprising:
a step of picking up an image of an observation target;
a step of emitting first illumination light and second illumination light having a spectrum different from a spectrum of the first illumination light;
a step of acquiring past emission information by transmitting a type of emitted illumination light from a light source control unit to an emission information acquisition unit, the units being run by a processor, at a time of emission for each frame, the processor being configured to associate the type of emitted illumination light with a specific storage light emission amount from among storage light emission amounts;
a step of generating a first illumination light image obtained by picking up an image of the observation target by using the first illumination light or a second illumination light image obtained by picking up an image of the observation target by using the second illumination light, in a frame for calculating a light amount;
a step of calculating a first light emission amount that is outputted on the basis of a brightness difference between brightness of the first illumination light image and a first target brightness and a second light emission amount that is outputted on the basis of a brightness difference between brightness of the second illumination light image and a second target brightness different from the first target brightness at any timing after the frame for calculating a light amount in a time series;
a step of storing the first light emission amount as a first storage light emission amount of the storage light emission amounts;
a step of storing the second light emission amount as a second storage light emission amount of the storage light emission amounts;
a step of selecting, in a case where the first illumination light is emitted in a scheduled emission frame after the frame for calculating a light amount in a time series based on the past emission information acquired at the time of emission for each frame, the latest first storage light emission amount as a first designated light emission amount from among one or more first storage light emission amounts;
a step of selecting, in a case where the second illumination light is emitted in the scheduled emission frame based on the past emission information acquired at the time of emission for each frame, the latest second storage light emission amount as a second designated light emission amount from among one or more second storage light emission amounts; and
a step of causing the light source device to emit the first illumination light with the first designated light emission amount or the second illumination light with the second designated light emission amount in the scheduled emission frame.

16. An operation method for an endoscope system, comprising:
a step of picking up an image of an observation target;
a step of emitting first illumination light and second illumination light having a spectrum different from a spectrum of the first illumination light according to a specific light emission pattern;
a step of acquiring past emission information by transmitting a type of emitted illumination light from a light source control unit to an emission information acquisition unit, the units being run by a processor, at a time of emission for each frame, the processor being configured to associate the type of emitted illumination light with a specific storage light emission amount from among storage light emission amounts;
a step of acquiring a first illumination light image obtained by picking up an image of the observation target by using the first illumination light or a second illumination light image obtained by picking up an image of the observation target by using the second illumination light, in a frame for calculating a light amount;
a step of calculating a first light emission amount that is outputted on the basis of a brightness difference between brightness of the first illumination light image and a first target brightness or a second light emission amount that is outputted on the basis of a brightness difference between brightness of the second illumination light image and a second target brightness different from the first target brightness, from a frame for calculating a light amount to a scheduled emission frame that is a frame after a lapse of a specific number of frames;
a step of storing the first light emission amount as a first storage light emission amount of the storage light emission amounts;
a step of storing the second light emission amount as a second storage light emission amount of the storage light emission amounts; and
a step of causing the light source device to emit the first illumination light with the first storage light emission amount or the second illumination light with the second storage light emission amount in the scheduled emission frame.

* * * * *